United States Patent
Gaines et al.

(10) Patent No.: US 11,542,080 B2
(45) Date of Patent: Jan. 3, 2023

(54) TRACK AND TRACE PACKAGING AND SYSTEMS

(71) Applicant: Baby Blue Brand Corp., Bala Cynwyd, PA (US)

(72) Inventors: L. Kris Gaines, Norfolk, VA (US); Veonous Martin Jacques, Philadelphia, PA (US); Auguste Jacques, Philadelphia, PA (US); David A. Gaines, Norfolk, VA (US); Crystal G. Morrison, Pittsburgh, PA (US); Troy Miles, Murrysville, PA (US)

(73) Assignee: BBB Holding Company, Jenkintown, PA (US)

( * ) Notice: Subject to any disclaimer, the term of this patent is extended or adjusted under 35 U.S.C. 154(b) by 0 days.

(21) Appl. No.: 16/042,416

(22) Filed: Jul. 23, 2018

(65) Prior Publication Data
US 2018/0327160 A1    Nov. 15, 2018

Related U.S. Application Data

(63) Continuation-in-part of application No. 16/018,428, filed on Jun. 26, 2018, now abandoned, and a
(Continued)

(51) Int. Cl.
*B65D 55/02*    (2006.01)
*G06K 19/06*    (2006.01)
(Continued)

(52) U.S. Cl.
CPC .............. *B65D 75/30* (2013.01); *B65D 79/02* (2013.01); *G06Q 10/0833* (2013.01);
(Continued)

(58) Field of Classification Search
CPC ................ B65D 75/30; B65D 2203/06; B65D 2203/10; B65D 2203/12; B65D 81/2069;
(Continued)

(56) References Cited

U.S. PATENT DOCUMENTS

| | | |
|---|---|---|
| 1,818,726 A | 8/1931 | Lowe |
| 2,998,306 A | 8/1961 | Huyck et al. |

(Continued)

FOREIGN PATENT DOCUMENTS

| | | |
|---|---|---|
| EP | 0341699 A1 | 11/1989 |
| EP | 548283 B1 | 6/1993 |

(Continued)

*Primary Examiner* — Gideon R Weinerth
(74) *Attorney, Agent, or Firm* — Alan G. Towner; Leech Tishman Fuscaldo & Lampl

(57) ABSTRACT

Track and trace packaging is disclosed which may also be damage indicating. Track and trace functionality may be incorporated on, in or near the packaging at various stages of a supply chain. A damage indicating material can be incorporated into a variety of packaging substrates, which may change color when exposed to oxygen, excessive heat and/or excessive pressure. An anti-counterfeiting taggant material may be used to provide track and trace capabilities. Exemplary products with which the present track and trace packaging may be used include packaged condoms, food and beverages, pharmaceuticals, cannabis and the like.

18 Claims, 17 Drawing Sheets

Related U.S. Application Data continuation-in-part of application No. 14/939,989, filed on Nov. 12, 2015, now Pat. No. 10,029,841, which is a continuation-in-part of application No. 14/272,156, filed on May 7, 2014, now abandoned.

(60) Provisional application No. 62/078,819, filed on Nov. 12, 2014, provisional application No. 61/971,187, filed on Mar. 27, 2014, provisional application No. 61/820,315, filed on May 7, 2013.

(51) Int. Cl.
| | |
|---|---|
| *B65D 75/30* | (2006.01) |
| *G09F 3/03* | (2006.01) |
| *G06Q 10/08* | (2012.01) |
| *G09F 3/00* | (2006.01) |
| *B65D 79/02* | (2006.01) |

(52) U.S. Cl.
CPC ........ *G09F 3/0292* (2013.01); *B65D 2203/06* (2013.01); *B65D 2203/10* (2013.01); *B65D 2203/12* (2013.01); *B65D 2401/55* (2020.05)

(58) Field of Classification Search
CPC .............. B65D 55/026; B65D 2401/55; B65D 55/066; B65D 79/02; G06Q 10/0833; G09F 3/0292; G09F 3/03; G09F 3/0329; B42D 25/30; B42D 25/378; G06K 7/10405; G06K 7/10386; G06K 19/06084; G06K 19/06009; G06K 19/14; Y10T 428/15; Y10T 428/1481; Y10T 428/1486; Y10T 428/24802; Y10T 428/1352; Y10T 428/24959; Y10T 428/915; Y10T 428/916; Y10T 428/24851
USPC ........... 206/69; 116/206; 215/230, 203, 365, 215/364, 459; 283/99; 383/5; 428/915, 428/916
See application file for complete search history.

(56) References Cited

U.S. PATENT DOCUMENTS

| | | | |
|---|---|---|---|
| 3,221,428 A | 12/1965 | Fischler et al. | |
| 3,633,216 A | 1/1972 | Schonholtz | |
| 3,899,295 A * | 8/1975 | Halpern | A61L 2/28 422/400 |
| 4,505,399 A * | 3/1985 | Weiner | B65D 55/066 215/203 |
| 4,516,679 A | 5/1985 | Simpson et al. | |
| 4,526,752 A * | 7/1985 | Perlman | B65D 55/026 116/207 |
| 4,760,919 A * | 8/1988 | Pereyra | B65D 75/30 206/484.2 |
| 4,843,014 A | 6/1989 | Cukier | |
| 4,877,143 A | 10/1989 | Travisano | |
| 4,882,195 A * | 11/1989 | Butland | A61B 5/1172 427/255.6 |
| 4,905,851 A | 3/1990 | Thompson | |
| 4,910,803 A | 3/1990 | Cukier | |
| 4,919,966 A | 4/1990 | Shlenker | |
| 4,931,327 A | 6/1990 | Liu et al. | |
| 4,986,429 A * | 1/1991 | Singleton, Jr. | G09F 3/0341 215/230 |
| 4,998,666 A | 3/1991 | Ewan | |
| 5,005,695 A | 4/1991 | Tennefos et al. | |
| 5,020,831 A | 6/1991 | Benardelli | |
| 5,024,852 A | 6/1991 | Busnel et al. | |
| 5,062,928 A | 11/1991 | Smith | |
| 5,234,732 A | 8/1993 | Versic et al. | |
| 5,411,034 A | 5/1995 | Beck et al. | |
| 5,472,668 A | 12/1995 | Mills et al. | |
| 5,480,611 A | 1/1996 | Mills et al. | |
| 5,524,294 A | 6/1996 | Richardson et al. | |
| 5,549,924 A | 8/1996 | Shlenker et al. | |
| 5,581,978 A | 12/1996 | Hekal et al. | |
| 5,605,738 A * | 2/1997 | McGinness | B41M 3/144 250/365 |
| 5,617,812 A * | 4/1997 | Balderson | B65D 51/244 116/206 |
| 5,620,256 A | 4/1997 | Makrauer | |
| 5,650,329 A | 7/1997 | Warner | |
| 5,651,615 A * | 7/1997 | Hurier | G09F 3/0294 283/92 |
| 5,679,399 A | 10/1997 | Shlenker et al. | |
| 5,719,828 A | 2/1998 | Haas et al. | |
| 5,786,219 A * | 7/1998 | Zhang | G01N 33/585 428/407 |
| 5,839,592 A | 11/1998 | Hayes | |
| 5,849,594 A | 12/1998 | Balderson et al. | |
| 5,882,116 A * | 3/1999 | Backus | B65D 27/30 206/807 |
| 5,965,276 A | 10/1999 | Shlenker et al. | |
| 6,048,098 A | 4/2000 | Vetter | |
| 6,149,203 A | 11/2000 | Hanlon | |
| 6,175,962 B1 | 1/2001 | Michelson | |
| 6,264,033 B1 | 7/2001 | Kannabiran et al. | |
| 6,309,690 B1 * | 10/2001 | Brogger | A63B 45/02 427/256 |
| 6,596,354 B1 | 7/2003 | Longdon et al. | |
| 6,767,509 B1 | 7/2004 | Griesbach et al. | |
| 6,929,118 B1 | 8/2005 | Izz | |
| 7,294,379 B2 | 11/2007 | Ko et al. | |
| 7,546,923 B2 * | 6/2009 | Abergel | B65D 23/14 206/581 |
| 7,887,894 B2 * | 2/2011 | Chiba | B32B 27/308 428/36.6 |
| 7,898,422 B2 * | 3/2011 | Puccini | G08B 13/2434 340/572.8 |
| 7,913,870 B2 * | 3/2011 | Vovan | B65D 77/208 215/230 |
| 8,030,261 B2 | 10/2011 | Harrison | |
| 8,114,673 B2 | 2/2012 | Mills et al. | |
| 8,158,230 B2 | 4/2012 | Culbertson et al. | |
| 8,584,836 B2 | 11/2013 | De Waleffe | |
| 8,663,998 B2 * | 3/2014 | Heacock | C09K 9/02 436/166 |
| 9,248,045 B2 | 2/2016 | Lee | |
| 9,579,532 B2 | 2/2017 | Hassan et al. | |
| 9,626,882 B2 | 4/2017 | Dodrill | |
| 9,650,194 B2 | 5/2017 | Hetherton | |
| 9,688,447 B2 * | 6/2017 | Murray | B65D 75/5883 |
| 10,011,141 B2 * | 7/2018 | Rosset | D21H 21/42 |
| 10,029,841 B2 * | 7/2018 | Gaines | B65D 75/04 |
| 10,565,411 B2 * | 2/2020 | Forster | G06K 19/0723 |
| 11,060,945 B2 * | 7/2021 | Dodrill | B65D 75/5855 |
| 11,396,413 B2 * | 7/2022 | Voellmicke | A61J 1/035 |
| 2003/0052786 A1 * | 3/2003 | Dickinson | B65D 5/4233 340/572.8 |
| 2003/0127846 A1 | 7/2003 | Laurie | |
| 2005/0036716 A1 | 2/2005 | Geyer | |
| 2005/0189255 A1 * | 9/2005 | Safian | B65D 51/245 206/459.5 |
| 2005/0258129 A1 | 11/2005 | Model | |
| 2006/0014045 A1 * | 1/2006 | Einhorn | B32B 27/08 428/690 |
| 2006/0026737 A1 | 2/2006 | Chen | |
| 2006/0108405 A1 | 5/2006 | Sanchez et al. | |
| 2006/0234014 A1 | 10/2006 | Liu et al. | |
| 2007/0085335 A1 * | 4/2007 | Lampe | B65D 5/68 283/74 |
| 2008/0149584 A1 * | 6/2008 | Martinelli | G06Q 10/08 215/202 |
| 2008/0210580 A1 | 9/2008 | Harrison | |
| 2009/0041083 A1 | 2/2009 | McParland | |
| 2010/0177993 A1 * | 7/2010 | Chen | B65D 33/2533 383/207 |
| 2010/0278454 A1 | 11/2010 | Huffer | |
| 2011/0041856 A1 | 2/2011 | Mistler | |
| 2011/0132788 A1 | 6/2011 | Middlesworth et al. | |

(56) References Cited

U.S. PATENT DOCUMENTS

| | | | |
|---|---|---|---|
| 2011/0134622 A1* | 6/2011 | Yu | H01Q 1/22 |
| | | | 361/814 |
| 2011/0259776 A1* | 10/2011 | Chen | B65D 31/02 |
| | | | 206/459.5 |
| 2011/0268371 A1 | 11/2011 | Kristal | |
| 2011/0287553 A1 | 11/2011 | Hassan et al. | |
| 2011/0308984 A1 | 12/2011 | Hennek | |
| 2012/0067374 A1* | 3/2012 | Raspati | B65D 33/2516 |
| | | | 134/21 |
| 2012/0142527 A1 | 6/2012 | Smyth et al. | |
| 2012/0165336 A1* | 6/2012 | Steiner | A61J 1/035 |
| | | | 514/249 |
| 2012/0217244 A1* | 8/2012 | Phaneuf | B65D 53/04 |
| | | | 220/212 |
| 2012/0222974 A1 | 9/2012 | De Waleffe | |
| 2012/0276647 A1 | 11/2012 | Mills et al. | |
| 2013/0130399 A1 | 5/2013 | Mills et al. | |
| 2013/0269592 A1 | 10/2013 | Heacock et al. | |
| 2014/0003743 A1 | 1/2014 | Luffman | |
| 2014/0138276 A1* | 5/2014 | Smith | B65B 69/00 |
| | | | 206/459.1 |
| 2014/0251859 A1 | 9/2014 | Weikart et al. | |
| 2014/0262898 A1* | 9/2014 | Anderson | B65B 55/08 |
| | | | 206/459.1 |
| 2014/0262919 A1* | 9/2014 | Hussain | A61J 1/035 |
| | | | 206/534 |
| 2014/0270581 A1* | 9/2014 | Jons | B65D 33/25 |
| | | | 383/37 |
| 2014/0332419 A1 | 11/2014 | Gaines et al. | |
| 2014/0367295 A1* | 12/2014 | Murray | B65D 33/004 |
| | | | 206/459.5 |
| 2015/0027918 A1* | 1/2015 | Chaturvedi | A61J 1/10 |
| | | | 206/459.1 |
| 2015/0255009 A1* | 9/2015 | Akhter | B65D 25/205 |
| | | | 206/459.1 |
| 2016/0180747 A1* | 6/2016 | Pietarinen | C09J 7/243 |
| | | | 206/438 |
| 2016/0264325 A1* | 9/2016 | Ruggiero Ruggieri | |
| | | | B65D 55/066 |
| 2017/0061834 A1* | 3/2017 | Versluys | G09F 3/0291 |
| 2018/0271722 A1* | 9/2018 | Gonzalez Martinez | |
| | | | A61B 5/0816 |
| 2018/0297778 A1* | 10/2018 | Widitora | B65F 1/002 |
| 2018/0327160 A1* | 11/2018 | Gaines | G06Q 10/0833 |
| 2019/0009942 A1* | 1/2019 | Hermans | B65B 61/26 |
| 2019/0065802 A1* | 2/2019 | Hirschmann | G06K 7/1417 |
| 2019/0382173 A1* | 12/2019 | Knight | B65D 55/12 |
| 2020/0046546 A1* | 2/2020 | Vélez | B65D 33/34 |
| 2021/0224498 A1* | 7/2021 | Lin | G06K 19/06009 |
| 2022/0250815 A1* | 8/2022 | Shpakovsky | B65D 51/248 |

FOREIGN PATENT DOCUMENTS

| | | |
|---|---|---|
| EP | 555972 B1 | 8/1993 |
| EP | 629497 A2 | 12/1994 |
| EP | 1118542 A1 | 7/2001 |
| EP | 1374918 B1 | 5/2004 |
| EP | 2488850 | 4/2011 |
| JP | 2005/91008 A | 4/2005 |
| WO | 1990/03632 A1 | 4/1990 |
| WO | 1996/12659 A1 | 5/1996 |
| WO | 1996/29262 A1 | 9/1996 |
| WO | 2003/037232 A1 | 5/2003 |
| WO | 2004/014266 A1 | 2/2004 |
| WO | 2010/146361 A2 | 12/2010 |
| WO | 20140182828 A1 | 11/2014 |

\* cited by examiner

ABCDEFGHIJKLMN
OPQRSTUVWXYZÀÅ
ÉÏØÜabcdefghij
klmnopqrstuvwx
yzàâéïöøüß1234
567890($€.,!?)

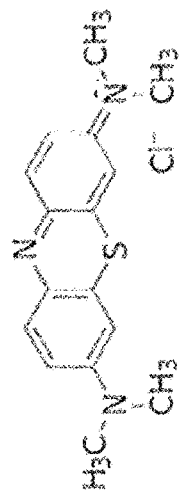
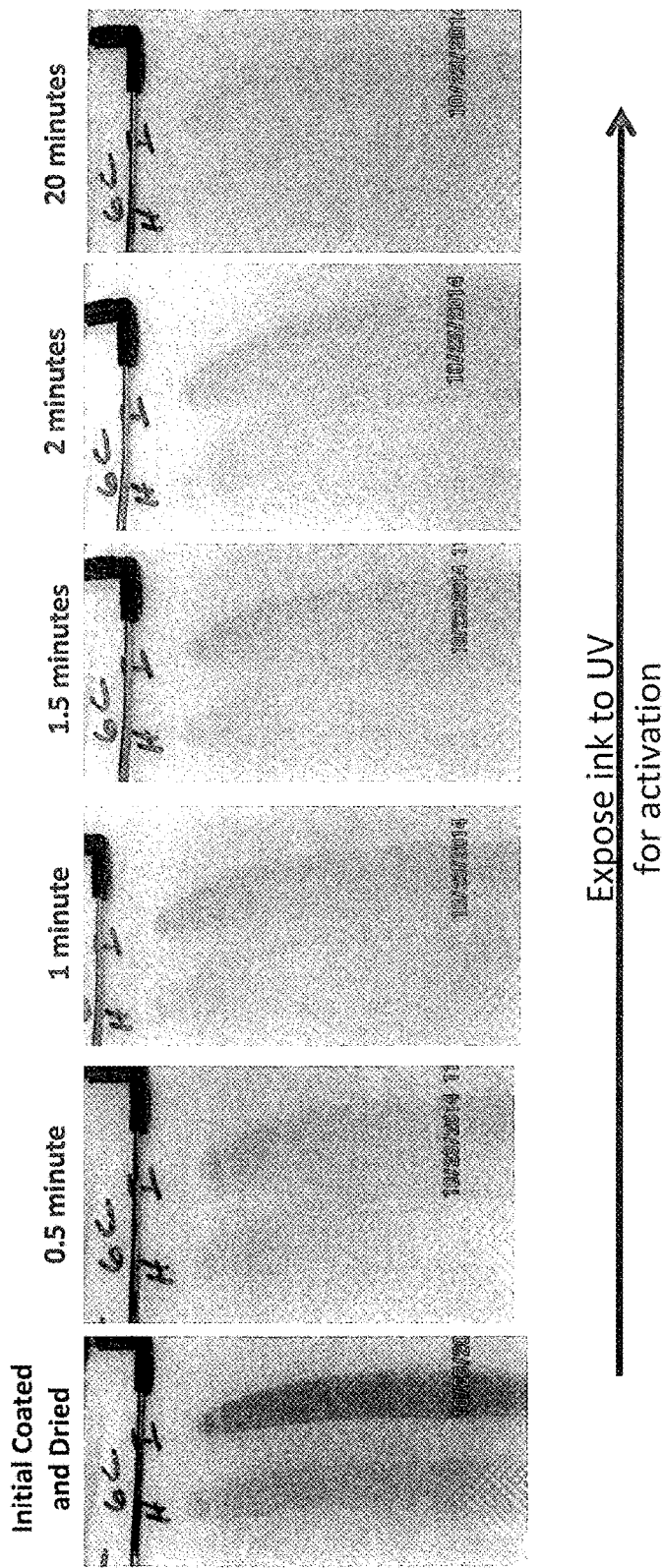
FIG. 17  UV activation of Ink 6C with MB and H/I modifications.

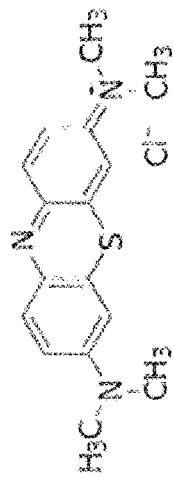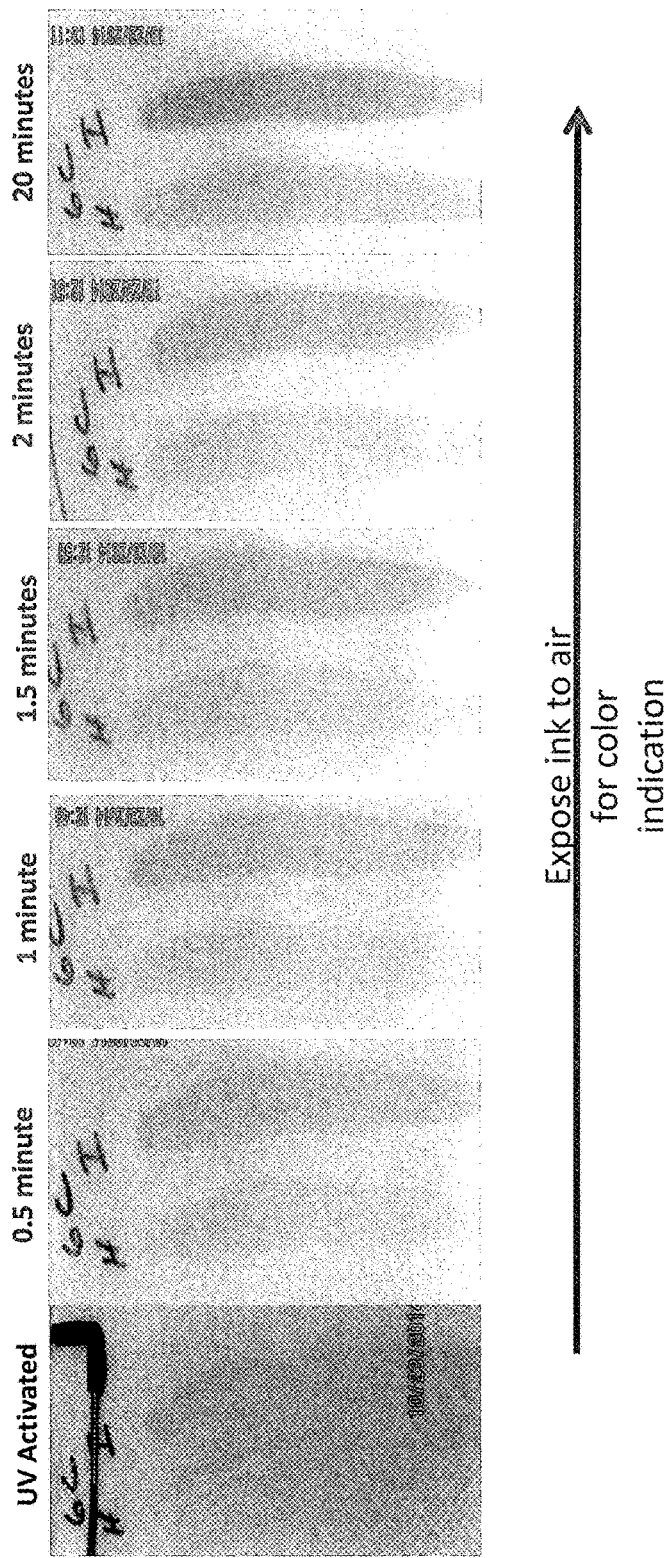
FIG. 18 Air exposure of UV activated Ink 6C with MB and H/I modifications.

Resorufin (RR)
2 min comparison
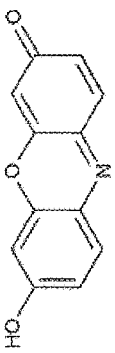
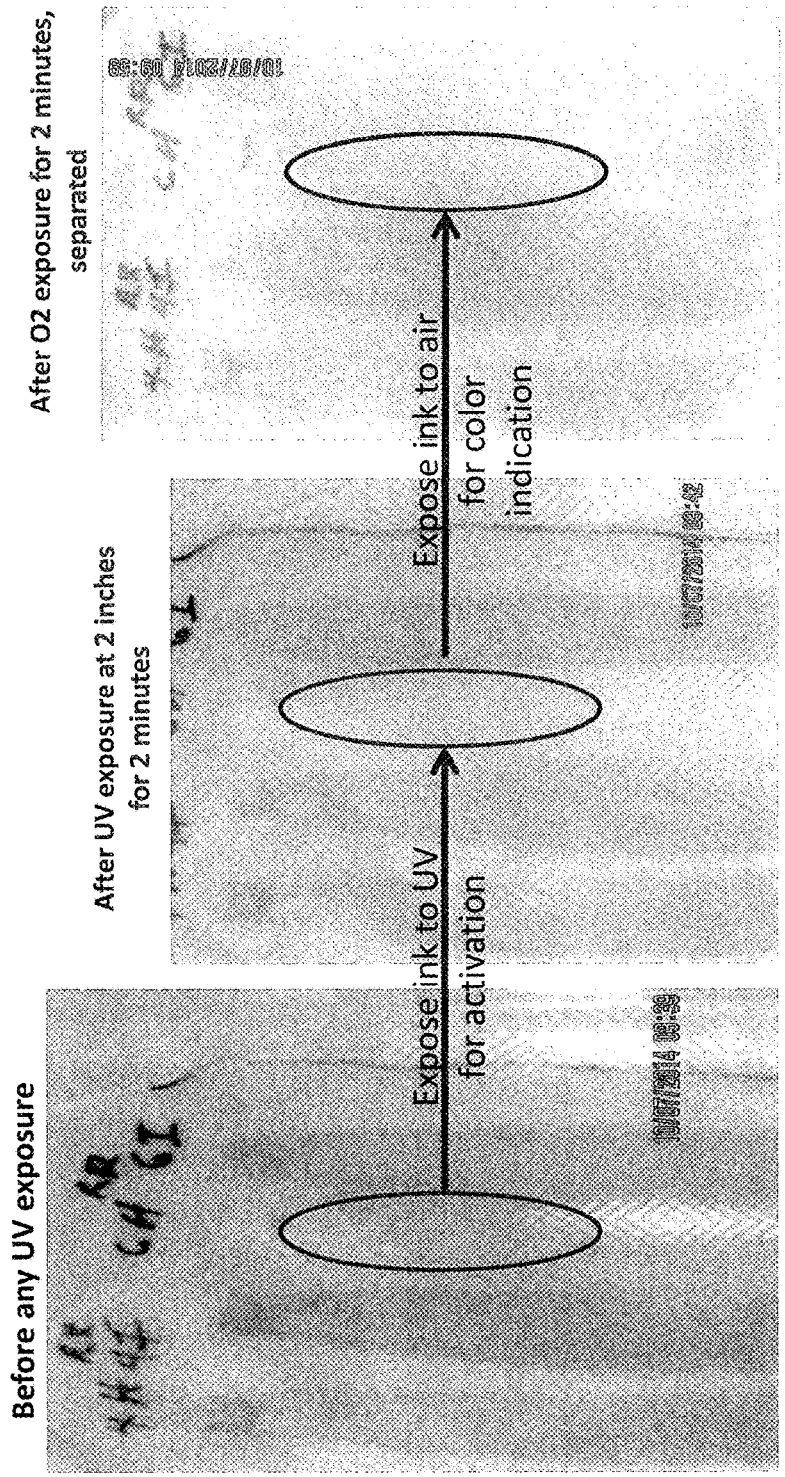
FIG. 19 UV activation and air exposure (after 2 mins) of Ink 4 with RR and H/I modifications.

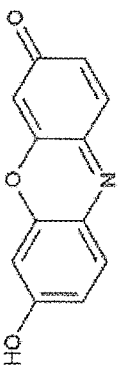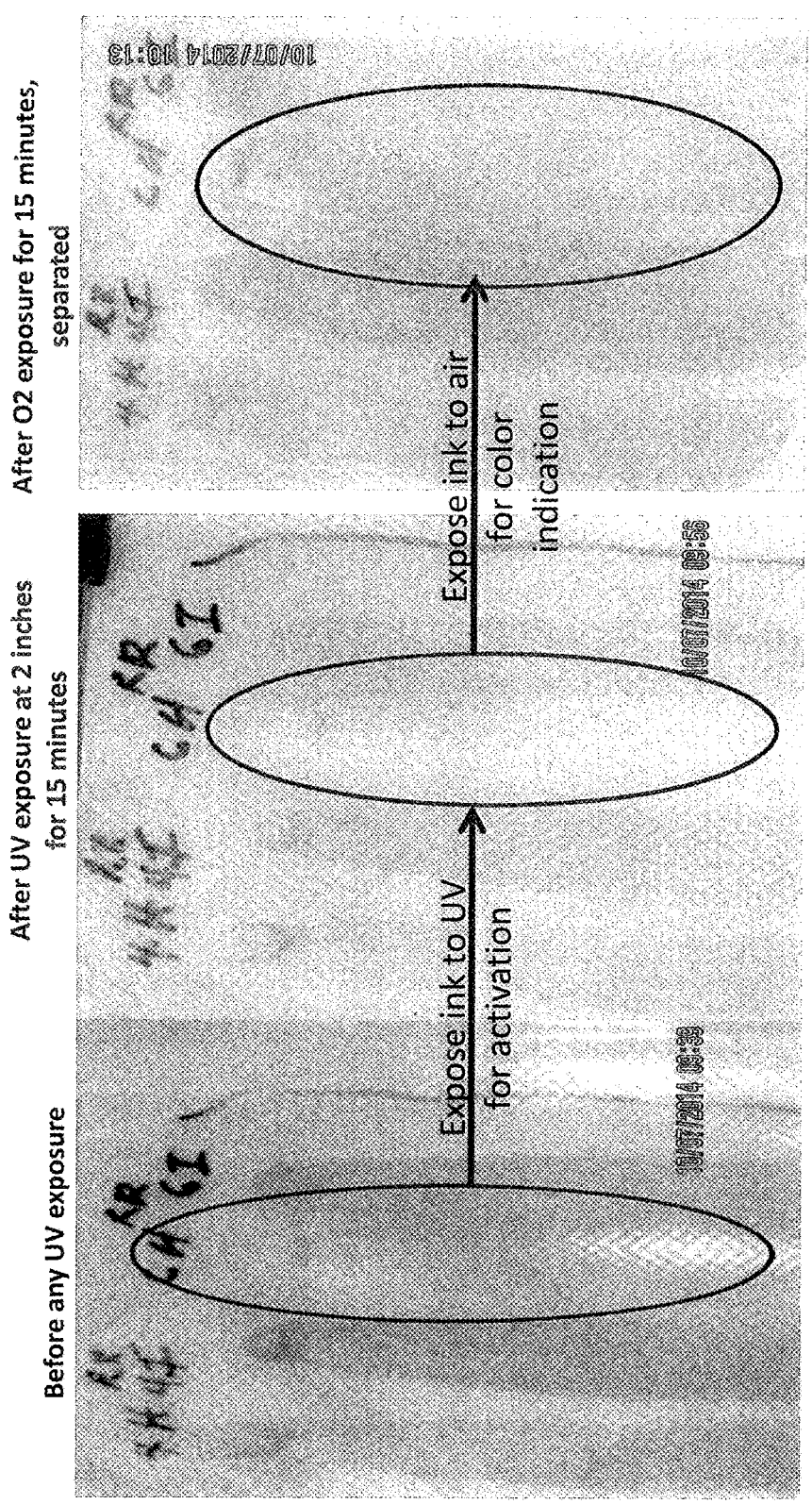
FIG. 20  UV activation and air exposure (after 15 mins) of Ink 4 with RR and H/I modifications.

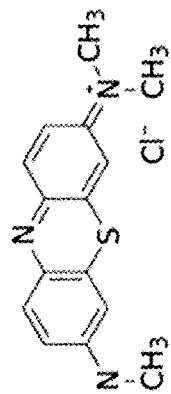
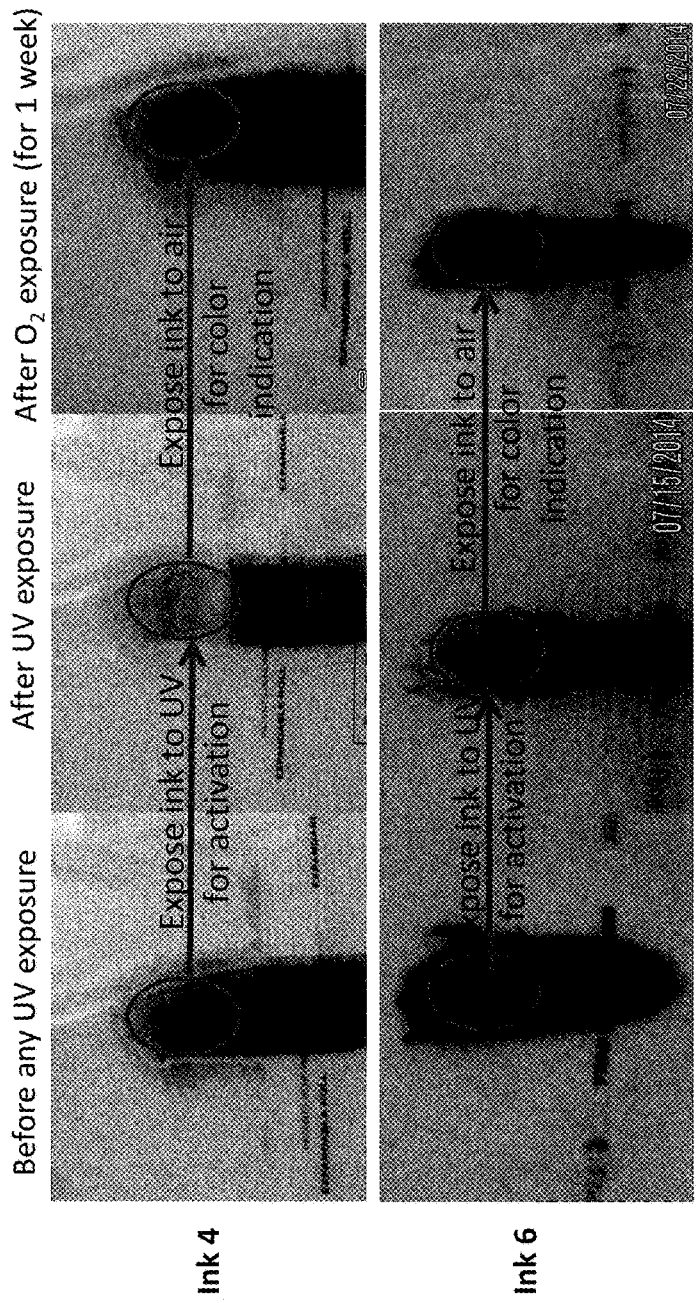
FIG. 21 UV activation and air exposure of Ink 4 and Ink 6 with MB and B modifications.

TRACK AND TRACE PACKAGING AND SYSTEMS

CROSS-REFERENCE TO RELATED APPLICATIONS

This application is a continuation-in-part of U.S. patent application Ser. No. 14/939,989 filed Nov. 12, 2015, now U.S. Pat. No. 10,029,841 to be issued Jul. 24, 2018, which is a continuation-in-part of U.S. patent application Ser. No. 14/272,156 filed May 7, 2014, now abandoned, which claims priority from U.S. Provisional Patent Application Ser. No. 61/820,315 filed May 7, 2013 and U.S. Provisional Patent Application Ser. No. 61/971,187 filed Mar. 27, 2014. The Ser. No. 14/939,989 application also claims the benefit of U.S. Provisional Patent Application Ser. No. 62/078,819 filed Nov. 12, 2014. This application is also a continuation-in-part of U.S. patent application Ser. No. 16/018,428 filed Jun. 26, 2018, which is a continuation of the above-referenced U.S. patent application Ser. No. 14/939,989 application. All of these applications are incorporated herein by reference.

FIELD OF THE INVENTION

The present invention relates to track and trace packaging for articles such as condoms, food and beverages, pharmaceuticals, cannabis, and the like. The track and trace packaging may also include damage indicating materials.

BACKGROUND INFORMATION

Conventional condom packaging provides an expiration date, but no obvious evidence of tampering. Air bubbles have been used in condom packaging as an indication of whether the packaging has been compromised. However, a need exists for an easy and reliable indication that condom packages have been compromised. In addition, a need exists for other types of damage indicating packaging for food products, pharmaceuticals and the like. Furthermore, it would be desirable to provide track and trace functions for damage indicating packaging and other types of packaging.

SUMMARY OF THE INVENTION

The present invention provides track and trace packaging which may also be damage indicating. Track and trace functionality may be incorporated on, in or near the packaging at various stages of a supply chain. A damage indicating material can be incorporated into a variety of packaging substrates, which may change color when exposed to oxygen, excessive heat and/or excessive pressure. An anti-counterfeiting taggant material may be used to provide track and trace capabilities. Exemplary products with which the present track and trace packaging may be used include packaged condoms, food and beverages, pharmaceuticals, cannabis and the like.

An aspect of the present invention is to provide a track and trace package comprising: an interior volume structured and arranged to contain a product; and a first packaging layer between the interior volume and an exterior of the package, wherein the first packaging layer comprises: an inner wrapper layer adjacent the interior volume; an outer layer comprising a film at least partially covering the inner wrapper layer and the interior volume; a pocket between an exterior surface of the inner wrapper layer and an interior surface of the outer layer; and at least one track and trace element attached to at least one of the inner wrapper layer or outer layer, or located inside the pocket.

Another aspect of the present invention is to provide a track and trace packaging material comprising: an inner wrapper layer comprising a film; an outer wrapper layer comprising a film; a pocket between the inner and outer wrapper layers; and at least one track and trace element attached to the inner or outer wrapper layer, or located in the pocket between the inner and outer wrapper layers.

A further aspect of the present invention is to provide a method of making a track and trace packaging material comprising: providing an inner wrapper layer comprising a film, an outer wrapper layer comprising a film, and a pocket between the inner and outer wrapper layers; and applying at least one track and trace element to the inner or outer wrapper layer, or in the pocket between the inner and outer wrapper layers.

These and other aspects of the present invention will be more apparent from the following description.

BRIEF DESCRIPTION OF THE DRAWINGS

FIGS. 15 and 16 illustrate damage indicating ink printing styles in accordance with embodiments of the invention.

FIGS. 17-21 illustrate damage indicating results from the examples below.

DETAILED DESCRIPTION

Figure 1:
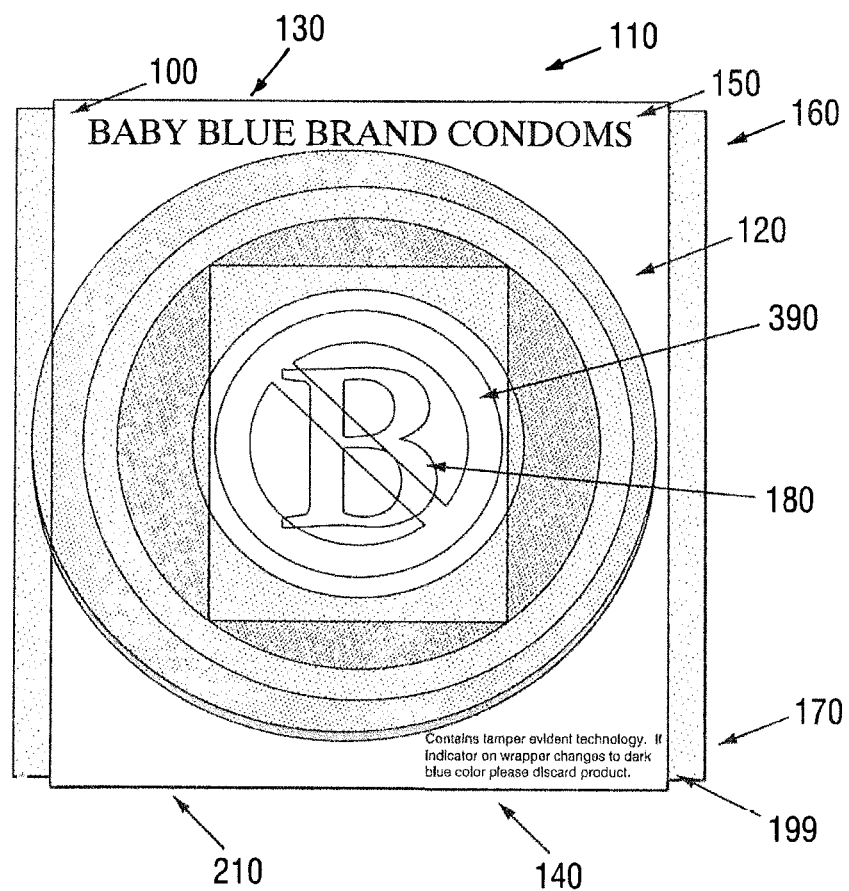
FIG. 1 is a partially schematic front view of a sealed condom package with a substantially transparent company logo and universally recognized symbol in accordance with an embodiment of the invention.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents. Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

An embodiment of the present invention provides active and intelligent product packaging including information printed thereon that allows anyone seeing it to know that the packaging has been compromised and to discard the product if damaged. A damage indicating material may be utilized that causes the packaging to change color when exposed to oxygen, extreme heat and/or excessive pressure such as compression or tension. The damage-indicating packaging gives the user clear indication that the product contained therein has been compromised and can be immediately discarded.

Although packaging for condoms is primarily described herein, the present invention may be used with other products to be packaged, and for other applications. Non-limiting examples include foods and beverages, pharmaceutical products and packaging (packaging, including modified atmosphere packaging, additives, coatings), cannabis, opioids, life sciences (lab supplies, including bioreactors and cell cultivating flasks, medical devices, diagnostics and equipment, surgical supplies and equipment, fertility supplies and equipment, imaging oxygen distributions in biomedicine, microbiology, and imaging intra and extra-cellular oxygen distribution in biological systems), military and defense supplies and equipment, weapons, security and authentication (steganography, anti-counterfeiting, anti-piracy, microprinting, document stamps or seals, currency, stamps, security tags and seals), documents, evidence, commercial products (electronic devices such as cell phones, tablets, computer chips and computers), utensils, tattoo supplies and shipping containers, high end (luxury goods, artwork, archival protection), detectors/sensors (variable oxygen content detectors, enzymatic sensors, oxygen distribution sensors), advanced packaging (biodegradeable packaging, Braille-based packaging) and other advance materials (reactive and responsive materials).

In certain embodiments, the damage indicating packaging may be provided as an overwrap for a previously packaged product, such as an overwrap for pre-packaged food or pharmaceutical products. For example, pharmaceutical pills, tablets, capsules, liquids, etc. that are packaged in bottles, blister wraps and the like may be overwrapped with the damage indicating packaging. In other embodiments, the food, pharmaceutical or other product may be directly wrapped with the damage indicating packaging.

Further features of the invention provide for the information to be printed on a front and/or back layer of the packaging. The information may include any one or more of manufacturing information, artwork, text, logos, slogans, insignia, instructions or the like.

An embodiment of the invention also provides a process for manufacturing damage-indicating packaging with a film layer of plastic, foil, paper or the like having a damage indicating material applied thereto. The packaging film layer and damage indicating material may be exposed to electromagnetic radiation, which renders the damage indicating material substantially colorless. In certain embodiments, the damage indicating material may be added to a layer of the packaging prior to the product being inserted and the packaging being sealed. A sealing unit may seal the package layers together around each product and dispense the packaged products either individually or in strips. The sealing unit may also print manufacturing information on the sealed packages.

Figure 2:
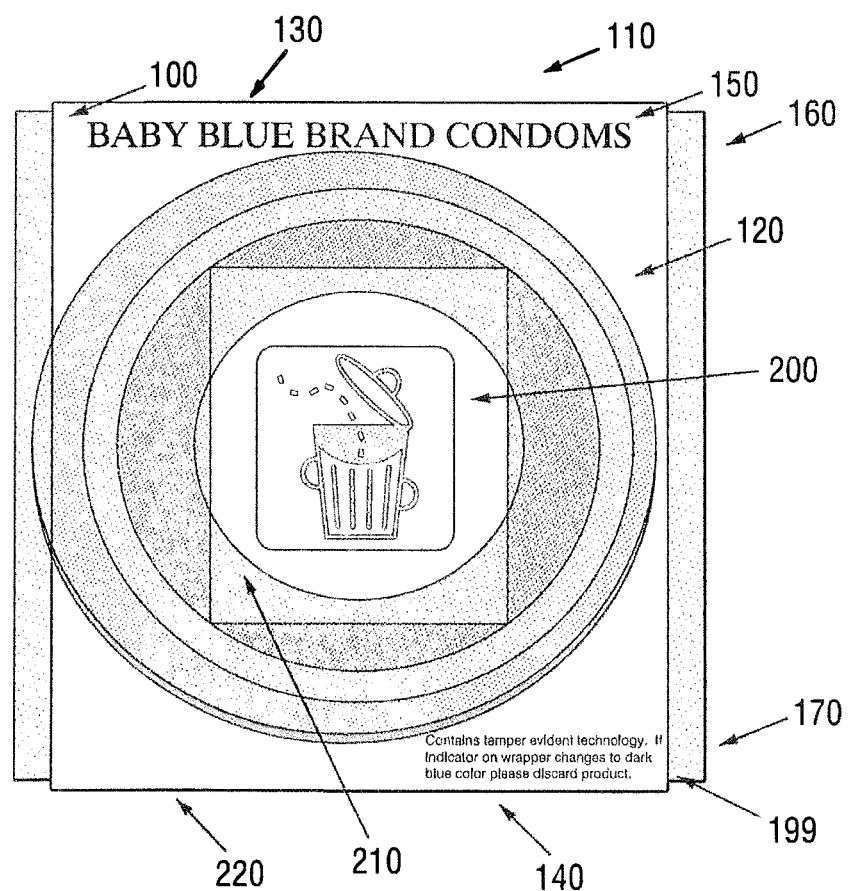
FIG. 2 is a partially schematic back view of the sealed condom package of FIG. 1 showing a substantially transparent universal throwaway symbol in accordance with an embodiment of the invention.

Referring now to an embodiment of the invention in more detail, in FIGS. 1 and 2, the combination of a condom and a package therefor is schematically shown at 100. The combination comprises a package shown generally at 110, and a rolled condom shown generally at 120. The package comprises a front wrapper panel or layer 130 and a back wrapper panel or layer 140. The front 130 and back 140 wrapper layers are sealed to one another around their respective edges. Labeling is shown generally at 150. Package instructions are shown generally at 199. In the embodiment shown, the instructions 199 state "Contains tamper evident technology. If indicator on wrapper changes to dark blue color please discard product". As shown in FIG. 1, a front outer layer 210 covers the front wrapper layer 130. A damage indicating material is applied on the front outer layer 210. As shown in FIG. 2, a back outer layer 220 covers the back wrapper layer 140, and a damage indicating material is applied on the back outer layer 220.

Still referring to FIGS. 1 and 2, universal symbols 190, 200 and a company logo 180 are printed on the package with a damage indicating material that includes a reactive dye such as methylene blue, alternative oxygen sensitive reactive dye, or alternative damage indicating material on package interiors, and processed to convert them to a colorless or different colored form. When the reactive damage indicating material is subsequently activated by exposure to oxygen, extreme heat, or excessive pressure, such as compression or tension, it changes in appearance. For example, the reactive damage indicating material changes color when exposed to oxygen. The color change should be sufficiently stable such that the color is visible for a sufficiently long time period. In certain embodiments, the long-term stability may be for periods of days, weeks, months or years.

Figure 3:
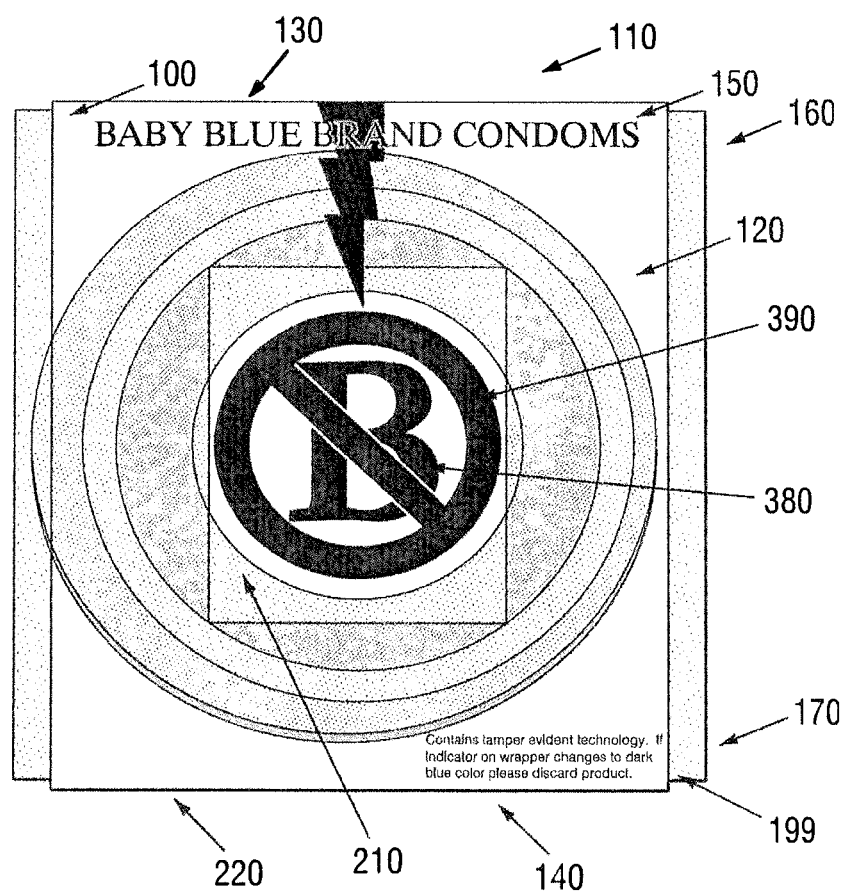
FIG. 3 is a partially schematic front view of a condom package once exposed to oxygen with tamper evident coloring displaying a universally recognized symbol as a result of color bloom of a damage indicating material in accordance with an embodiment of the present invention.
Figure 4:
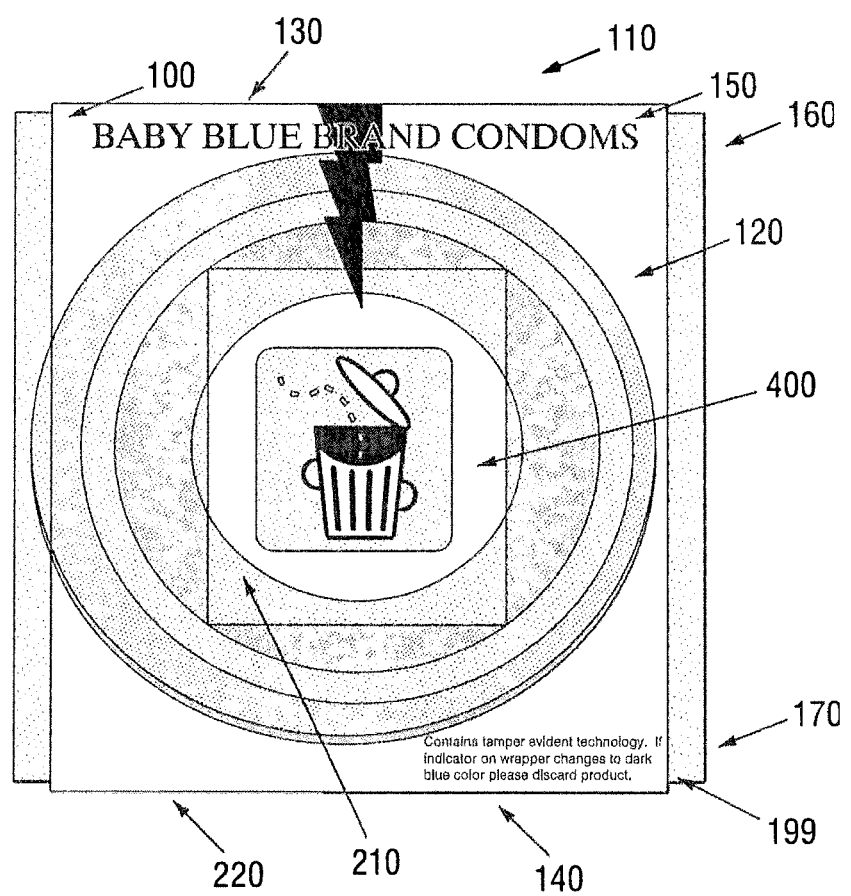
FIG. 4 is a partially schematic back view of the condom package of FIG. 3 once exposed to oxygen with tamper evident coloring displaying a universally recognized symbol or customized symbol as a result of the color bloom of the damage indicating material in accordance with an embodiment of the present invention.

FIGS. 3 and 4 schematically illustrate the condom package 100 in a damage-indicating state in which the condom wrapper has been torn. The universal symbols 390, 400 and company logo 380 are re-oxidized and change color (in the case of methylene blue) due to exposure to oxygen, or bloom with color due to extreme heat, excessive pressure, compression or tension. Re-oxidation is indicated with a color bloom of the universal symbols 390, 400 and company logo 380.

It will be understood that the rolled condom 120 as shown in FIGS. 1-4 has an open end 160 and a closed end 170. However, the precise details of the condom 120 are not relevant to the present invention, e.g., the condom may be pre-lubricated or not, may have a tip for collection of ejaculate, etc.

Figure 5:
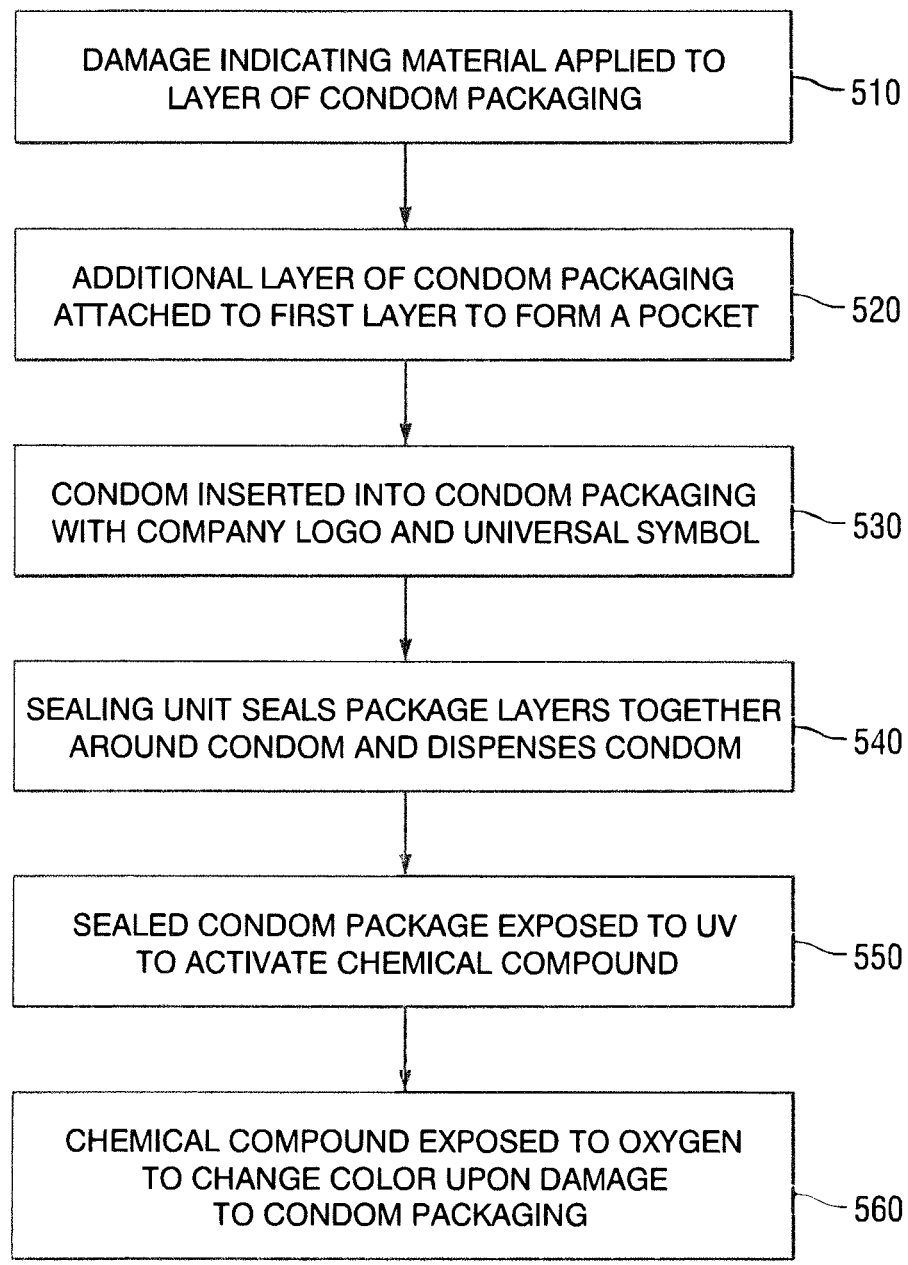
FIG. 5 is the flow diagram illustrating a method of making a damage indicating condom package in accordance with an embodiment of the invention.

FIG. 5 is a flow diagram illustrating a method of making a damage evident condom package in accordance with an embodiment of the present invention. In step 510, the interior wall of a condom packaging layer is coated with a damage indicating material such as methylene blue, any suitable alternative oxygen-sensitive reactive dyes, or responsive, color-changing material combination. The material may be applied by any suitable means such as spraying, brushing, screen printing, ink jet printing or the like. Methylene blue dye may be used in the printing process. Other responsive materials may be thiazines, thionines, oxazines, azines, triphenylmethane, indophenol, indigo, thioindigo, pyridinium viologens, and quinone-based species. Additional responsive materials may be non-toxic phosphorous pigmentation, or any alternative oxygen sensitive reactive dyes or any dyes that change color when exposed to oxygen, extreme heat, or excessive pressure, compression or tension. The responsive, damage indicating material may comprise more than one type of reactive dye. There will be associative processes to prepare the oxygen sensitive reactive dyes to reduce it to a colorless form. The printer may be of conventional construction and operation and sprays dye onto the packaging. The manufacturing information is provided by a processor (not shown), the operation of which is not germane to this invention, and which also controls printing by the sealing unit.

In step 520, another layer, which may also have damage indicating material applied thereto, is sealed or otherwise attached to the layer formed in step 510, e.g., to thereby form a pocket.

In step 530, a condom is inserted into the condom package or pocket. The condom may optionally be pre-wrapped in any suitable type of wrapper prior to insertion into the pocket. A company logo and/or universal symbols may be printed on one or more of the layers of packaging.

In step 540, a sealing unit seals the package layers together around each condom 120 and dispenses the condoms either individually or in strips.

In step 550, the sealed condom package is exposed to electromagnetic radiation, such as ultraviolet radiation or any other radiation of suitable wavelength, e.g., to render the damage indicating material substantially colorless.

In step 560, the chemical compound is exposed to oxygen to change the color of the damage indicating material by oxidation or another type of chemical reaction that changes the reactive dye from colorless to colored or from one color to another upon tampering, extreme heat, excessive pressure, compression, tension or any other breach of the condom wrapper such as a tear, pin-prick, or intentionally opening condom packaging. Printing between the layers of packaging prevents the dye from coming into contact with the condom. Is thus not possible for a user to experience any reaction due to contact with the dye.

Figure 6:
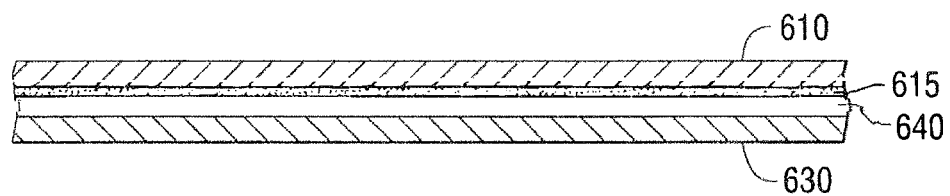
FIG. 6 is a partially schematic side sectional view showing a portion of a layered packaging material in accordance with an embodiment of the present invention.
Figure 7:
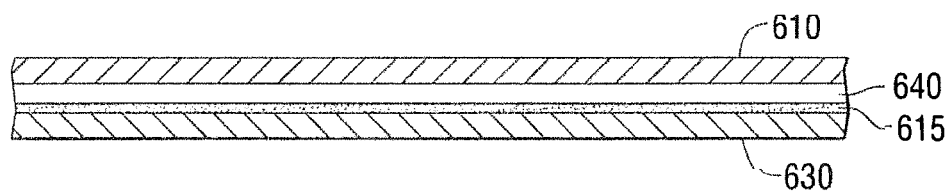
FIG. 7 is a partially schematic side sectional view showing a portion of a layered packaging material in accordance with another embodiment of the present invention.

FIGS. 6 and 7 are partially schematic side sectional views illustrating various condom packaging layers in accordance with embodiments of the present invention. In FIG. 6, an outer layer 610 is provided with a layer of damage indicating material 615 applied thereto. An inner condom wrapper layer 630 is located adjacent to the outer layer 610 and damage indicating material 615. In certain embodiments, the inner wrapper layer 630 may not be adhered to the layer of damage indicating material 615, as shown by the gap 640 in FIG. 6. Although the gap 640 is shown as a physical spacing between the layers 630 and 615 in FIG. 6, it should be recognized that the gap may be closed such that the layers 630 and 615 contact each other. For example, when the space between the outer layer 610 and inner wrapper layer 630 is evacuated, the layer of damage indicating material 615 would typically contact the underlying inner wrapper layer 630. Alternatively, when the space between the outer layer 610 and inner wrapper layer 630 is filled with an inert or non-reactive gas, the pressure of the gas may result in the formation of a physical gap 640, as shown in FIG. 6.

The embodiment shown in FIG. 7 is similar to the embodiment of FIG. 6, except the layer of damage indicating material 615 is applied to the outer surface of the inner wrapper layer 630 rather than the inner surface of the outer layer 610.

In accordance with embodiments of the present invention, the various inner condom wrapper layers and outer layers may be made of any suitable materials such as polymeric films, foils, paper and the like. Some examples of polymeric layers include cellulosic materials, vinyl polymers such as polyvinyl alcohol and polyacrylates, polyolefins such as polyethylene, polyethylene terephthalate (PET), ethylene vinyl acetate copolymers, polyethylene, nylon (polyamide) and the like. The inner wrapper layers and outer layers may be made of the same or different materials. In certain embodiments, the inner wrapper layers may comprise foil coated with any of the aforementioned polymers, or such polymers alone. In certain embodiments, the outer layers may comprise polyethylene or the like, which may optionally be coextruded with nylon or the like.

In an embodiment of the invention, a condom or other product is disposed in an inner wrapper, an outer wrapper surrounds the inner wrapper, and a layer of damage indicating material is applied to the inner surface of the outer wrapper. Alternatively, as described above, the outer surface of the inner wrapper may have the damage indicating material applied thereto. In both of these embodiments, the space between the inner and outer wrappers may be evacuated by any suitable type of vacuum source in order to remove gasses including oxygen from the space between the wrappers. In this embodiment, when the outer wrapper is punctured, torn or otherwise breached, air will fill the previously evacuated space between the inner and outer wrappers, thereby corning into contact with the relatively large surface areas of the wrappers, i.e., the outer surface of the inner wrapper will be exposed to air and the inner surface of the outer wrapper will be exposed to air. The presence of the damage indicating material on the inner surface of the outer wrapper and/or on the outer surface of the inner wrapper will thereby provide an indication that the outer wrapper has been punctured, torn or otherwise breached and that air has entered the space between the wrappers. As an alternative to evacuating the space between the inner and outer wrappers, the inner space may be at least partially filled with an inert or non-reactive gas such as nitrogen or the like that does not cause the damage indicating material to react and change colors.

In accordance with an embodiment of the present invention, dual-wrapper arrangements as described above may be made by providing a pre-packaged condom or other product in the inner wrapper, followed by applying the outer wrapper around the inner wrapper. For example, the outer wrapper may be provided as a pre-formed pocket in which the inner wrapper containing the product is inserted, followed by sealing of the open end of the outer wrapper. As discussed above, before, during or after the sealing operation, the space between the inner and outer wrappers may be evacuated and/or filled with a non-reactive gas. As another example, separate sheets of outer wrapper material may be placed on opposite sides of the inner wrapper containing the product, following by sealing of the peripheral edges of the outer wrapper layers together to thereby seal the inner wrapper and product within the outer wrapper. Again, the space between the inner and outer wrappers may be evacuated and/or filled with a non-reactive gas during the sealing operation. Such operations, in which the product is first sealed in the inner wrapper followed by sealing an outer wrapper around the inner wrapper, may be conducted contemporaneously with each other, e.g., the inner and outer wrappers may be applied in the same manufacturing operation. Alternatively, pre-packaged products may be modified by applying the outer wrapper at a different time or location, e.g., at a different facility from the original product manufacturing location.

In accordance with another embodiment of the present invention, a single product wrapper is provided with multiple laminated layers in which at least one of the layers contains the damage indicating material. For example, a layer of damage indicating material may be sandwiched between inner and outer polymeric layers to provide a composite wrapper structure with damage indicating capabilities. As another example, a layer of damage indicating material may be applied on the inner surface of the single product wrapper. In this embodiment, the damage indicating material layer would be exposed to the product, and the damage indicating material must be non-reactive with the material of the product or any other liquids or gasses contained within the wrapper, and the damage indicating layer must not damage the product or vice versa.

The damage indicating material may comprise an absorption-based species that produces a visible color change caused by chromogenic chemistry that involves oxidation by molecular oxygen. Examples include methylene blue, resorufin, resazurin, thiazine, thionines, oxazine, azine, triphenylmethane, indophenol, indigo, thioindigo, pyridinium viologen, and quinone-based species. The damage indicating material may also comprise luminescence-based species such as polycyclic aromatic hydrocarbons, polypyridyl complexes, metalloporphyrins, including platinum and palladium complexes, cyclometallated complexes, and other luminescent metal complexes such as lead, aluminum, copper, gold, europium, terbium, molybdenum, and the like. Other damage indicating material species include fullerenes, fluorescent polymers, and modified polymeric materials containing absorption-based or luminescence-based species described above. Additional responsive materials may be non-toxic phosphorous pigmentation, or any alternative oxygen sensitive reactive dyes or any dyes that change color when exposed to oxygen, extreme heat, or excessive pressure, compression or tension.

The reactive/responsive species can be incorporated into a variety of formulations including inks, gels, plastics, composites and the like. Ink formulations include resin/binder variations such as gelatin, cellulosics such as hydroxyethylcellulose (HEC), ethyl cellulose, cellulose acetate, polyvinylalcohol (PVA), polyvinylpyrolidone (PVP), polyamides, polyurethanes, polyethylene oxide (PEO), poly acrylates such as polymethyl methacrylate (PMMA), polymethacrylate, and polystyrene or modified polystyrenes. The ink formulations may include inks typically used on plastic films and vacuum packaging films, or for pad printing, flexo printing, gravure printing, dot matrix style printing, steganography printing, and the like. Semiconductor variations include oxides of titanium, tin, tungsten, zinc and/or mixtures thereof. Semiconductor size variations include submicron diameter, sub 50 nm diameter, and sub 10 nm diameter. Sacrificial electron donor variations may be a mild reducing agent, amine such as sodium salt of ethylenediaminetetraacetic acid (NaEDTA) or triethanolamine (TEOA), saccharide such as glucose or fructose, antioxidant such as ascorbic acid or citric acid, or other easily oxidizable species such as glycerin or oxidizable polymer such as polyvinylalcohol (PVA). Additive variations include solubility modifiers such as surfactants, permeability modifiers such as silicones, and modifiers for oxygen transmissibility rate (OTR) or water vapor transmissibility rate (WVTR). Examples of additives include moisture absorbers, oxygen scavengers, microwave susceptors and antimicrobials.

In certain embodiments, anti-counterfeiting taggant materials may be added to the formulations in order to authenticate the product in order to protect against counterfeiting. Known types of taggants may be added to the damage indicating material. For example, taggant particles or compositions may be added to coatings, inks and adhesives, or embedded in packaging layers and/or labels. Types of anti-counterfeiting taggant materials include infrared (IR) responsive particles and inks, ultraviolet (UV) responsive particles and inks, secure pigments, metachromic materials, color-shift materials, thermochromic materials, and the like. A non-limiting example of commercially available taggants that may be added to, or used in association with, the damage indicating materials of the present invention is a particulate taggant material sold under the designation Microtaggant by Microtrace, LLC. Other types of commercially available taggant materials include SunGuard inks sold by Sun Chemical Corporation. When taggant particles or compositions are added to the present damage indicating coatings, they may typically be present in amounts ranging from a minimal detectable trace amount up to 5 or 10 weight percent of the coating, or more. For example, taggants may comprise from 0.001 to 5 weight percent, or from 0.01 to 2 weight percent, or from 0.1 to 1 weight percent of the material.

In certain embodiments, track and trace elements may be added to the formulations, added to the packaging outer layer, added to packaging inner layer, added to packaging design (pocket), added in proximity of the damage indicating material, added in proximity of the packaging layers or pocket, created by formation of unique patterns or layers or generated via methods such as blockchain that can capture, link and secure all information about the product. The track and trace elements may be used to identify, authenticate, retain information/data, record location, report location or provide live location tracking over a range distances (short range contact to long range global positioning). Types of track and trace elements include taggant materials as described above, and may also include machine readable codes such as Quick Response (QR) codes, bar codes, active radio frequency identification (RFID), passive RFID, Bluetooth low energy (BLE), WiFi, GPS and the like. Types of track and trace elements also include real-time live tracking systems (RTLS). RTLS can be based on a wide variety of systems including active RFID, passive RFID, infrared (IR), optical, ultrasound, WiFi, Bluetooth and the like and combinations thereof. Non-limiting examples of commercially available track and trace elements are embeddable RFID transponders from HID in low (LF), high (HF) and ultrahigh (UHF) frequencies and various form factors and sizes. Other types of commercially available track and trace elements include RFID inlay designs commercially available from Avery Dennison for operation in the UHF, HF bands and near field communication (NFC). For GPS track and trace elements, a commercially available GPS transceiver with a micro-battery or other suitable power source may be used. Different types of track and trace elements can be used in various combinations to meet the requirements for products. Blockchain technology can also generate track and trace capability for a product and/or substantially enhance capture, security, transparency and visibility of data from other track and trace technologies.

Figure 8:
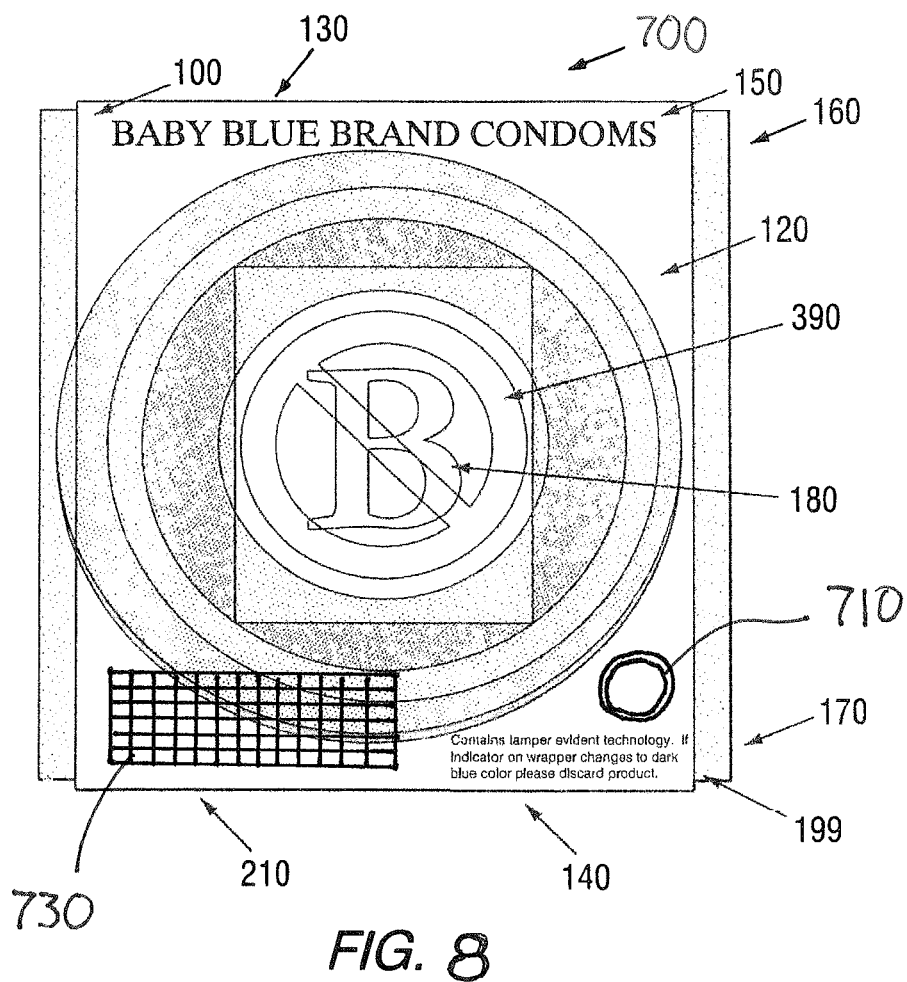
FIG. 8 is a partially schematic front view of a sealed track and trace condom package with damage indication in accordance with an embodiment of the invention.

FIG. 8 illustrates a track and trace and damage indicating condom package 700 in accordance with an embodiment of the present invention. The package 700 has damage indicating features similar to the embodiment shown in FIG. 1. In addition, the package 700 includes track and trace elements 710 and 730, as more fully described below. For example, at least one of the track and trace elements 710 and 730 may include a scannable code such as a QR code, bar code or crosshatching.

Figure 9:
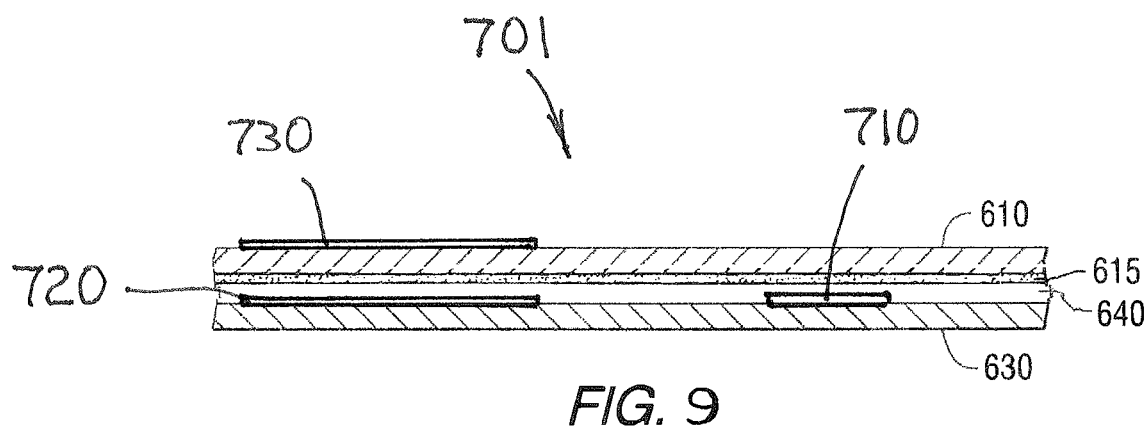
FIG. 9 is a partially schematic side sectional view showing a portion of a layered packaging material with track and trace elements and damage indicating materials in accordance with an embodiment of the present invention.
Figure 10:
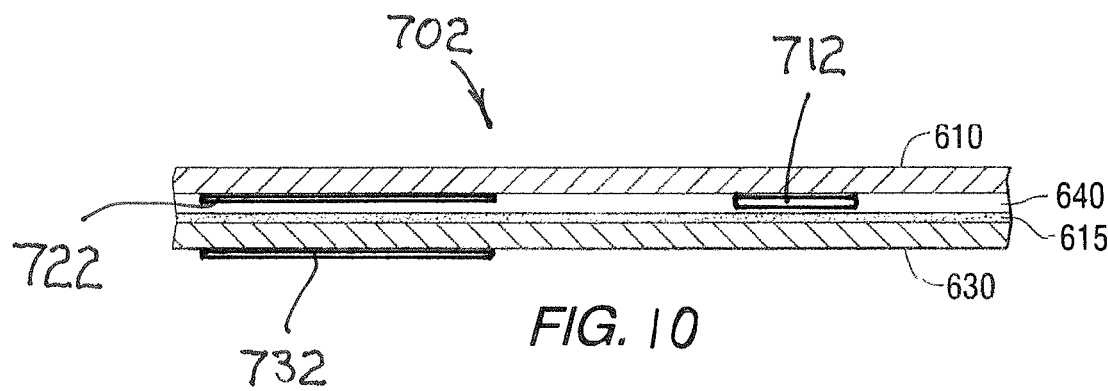
FIG. 10 is a partially schematic side sectional view showing a portion of a layered packaging material with track and trace elements and damage indicating materials in accordance with another embodiment of the present invention.

FIGS. 9 and 10 are partially schematic side sectional views of layered packaging materials 701 and 702 in accordance with embodiments of the present invention.

In the embodiment shown in FIG. 9, the layered packaging material 701 includes damage indicating elements 610, 615, 630 and 640 similar to the embodiment shown in FIG. 6. In addition, the packaging 701 of FIG. 9 includes track and trace elements 710, 720 and 730 located on or in the inner wrapper layer 630 or the outer layer 610. Although multiple track and trace elements 710, 720 and 730 are shown at different locations with respect to the inner wrapper layer 630 and outer layer 610 in FIG. 9, it is to be understood that only one such element may be used, or two such elements may be used.

In the embodiment shown in FIG. 10, the layered packaging material 702 includes damage indicating elements, 610, 615, 630 and 640 similar to the embodiment show in in FIG. 7. In addition, the packaging 702 of FIG. 10 includes track and trace elements 712, 722 and 732 located on or in the inner wrapper layer 630 or the outer wrapper layer 610. Although multiple track and trace elements 712, 722 and 732 are shown at different locations with respect to the inner wrapper layer 630 and outer layer 610 in FIG. 10, it is to be understood that only one such element may be used, or two such elements may be used.

Figure 11:
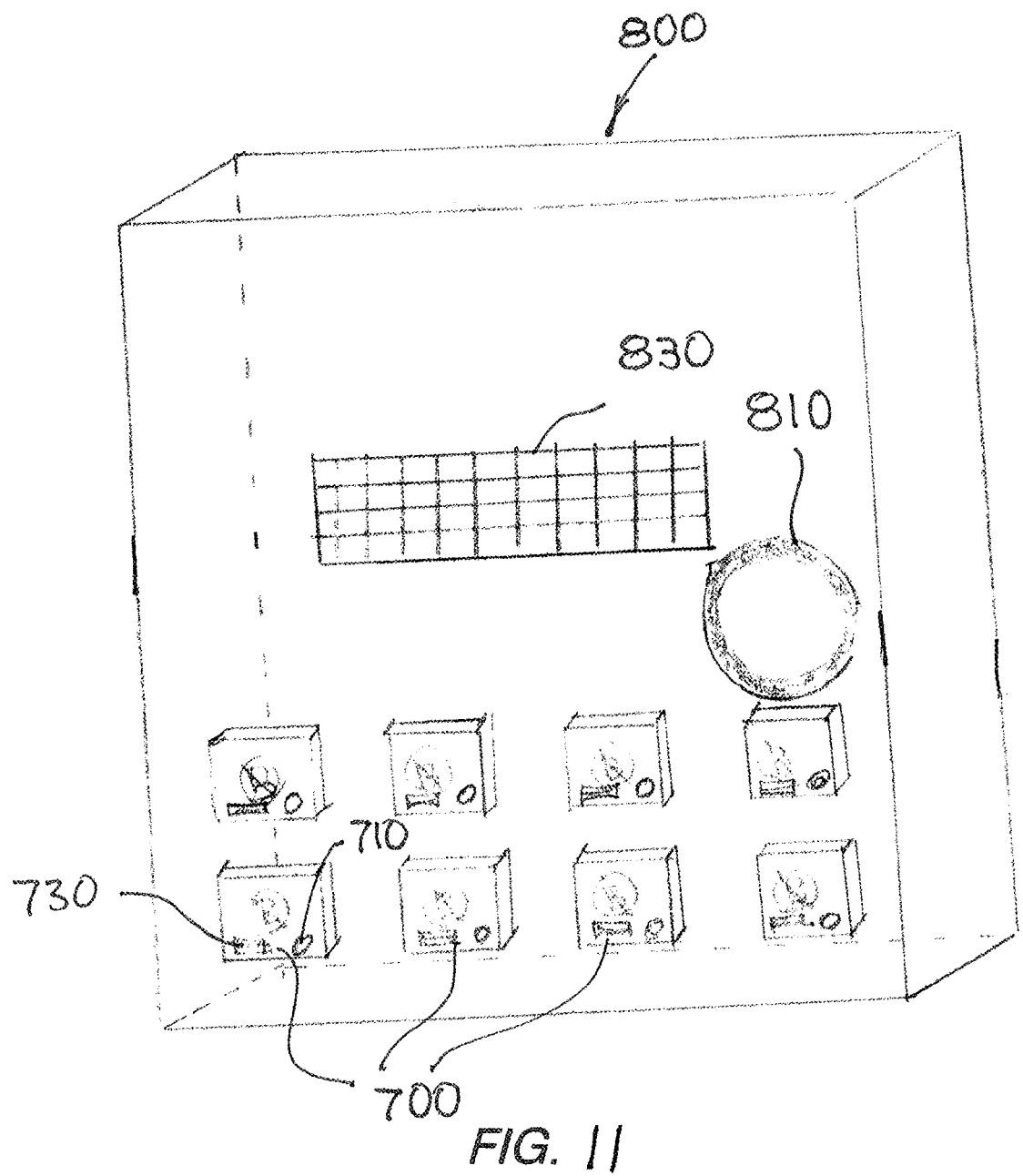
FIG. 11 is a partially schematic illustration of a multi-package container for damage indicating packaged products including track and trace features associated with the container in accordance with an embodiment of the invention.

FIG. 11 illustrates a multi-package container 800 for multiple packaged products 700, which may correspond to packaged products as shown in FIGS. 1 and 8, or other types of packaged products. As shown in FIG. 11, the multi-package container 800 includes track and trace elements 810 and 830 attached to the container 800. Although the individual packaged products 700 shown in FIG. 11 may have their own track and trace elements 710 and 730, the use of tack and trace elements 810 and 830 on the multi-package container 800 may eliminate the need for track and trace elements on the individual packages 700. Furthermore, the individual packages 700 may include damage indicating materials and features as described above.

Figure 12:
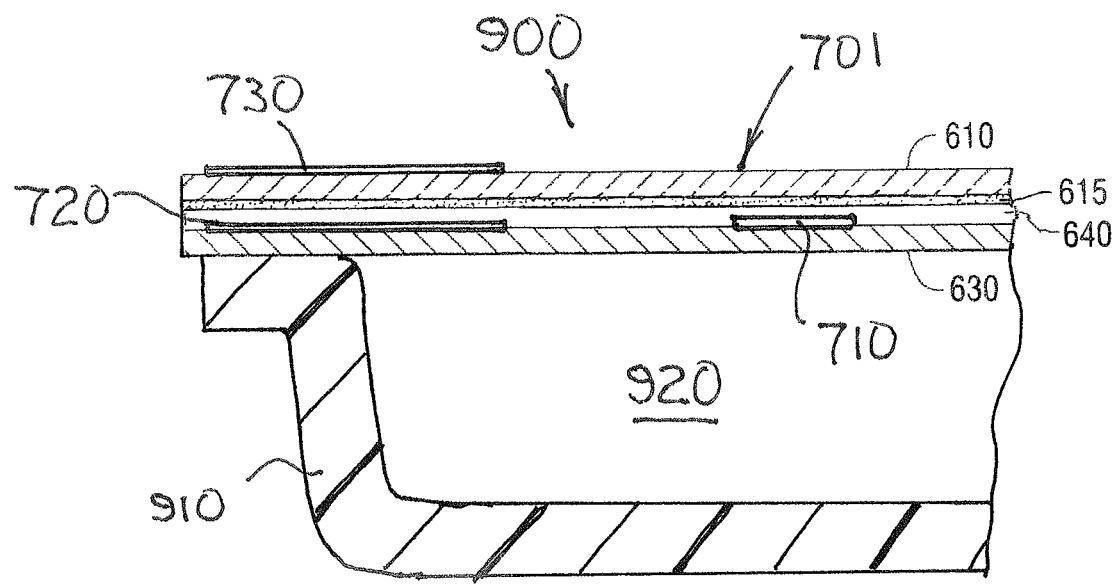
FIG. 12 is a partially schematic side sectional view of a portion of a package including a packaging wrapper including track and trace elements and damages indicating material in accordance with an embodiment of the present invention.

FIG. 12 illustrates a package 900 including a container 910 and a layered track and trace and damage indicating wrapper 701, which form a product pocket 920. The wrapper 701 includes damage indicating elements 610, 615, 630 and 640 as described above, and also includes track and trace elements 710, 720 and 730 as described above. The track and trace and damage indicating package 900 shown in FIG. 12 may be used with any desired type of product such as food products, pharmaceuticals, cannabis, and the like.

Figure 13:
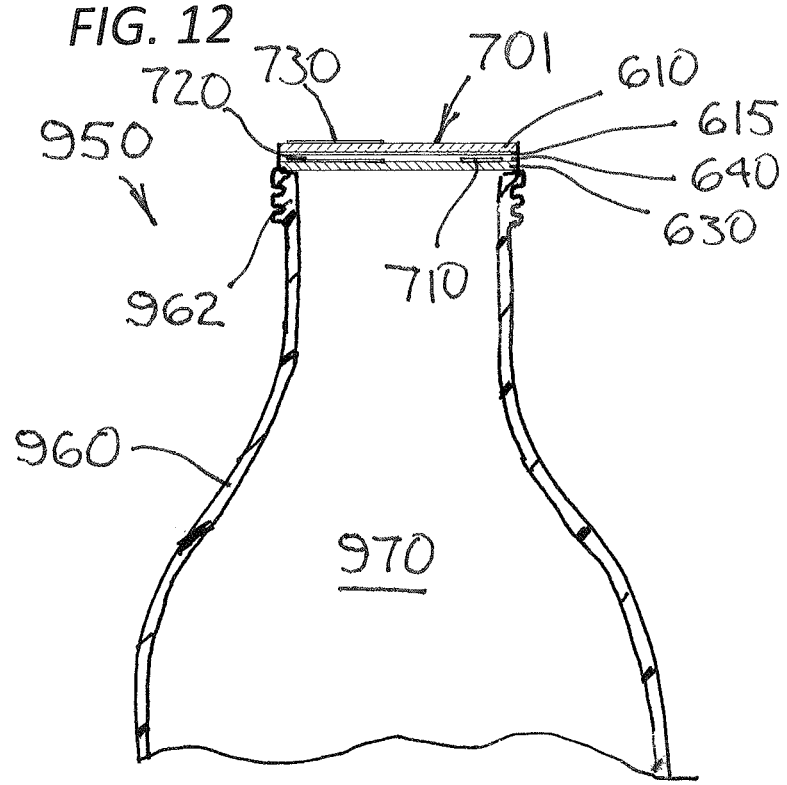
FIG. 13 is a partially schematic side sectional view of a portion of a package including a packaging seal including track and trace elements and damages indicating material in accordance with another embodiment of the present invention.

FIG. 13 illustrates a package 950 including a container 960 with a threaded upper neck and opening 962, and a layered track and trace and damage indicating seal 701, which form a product pocket 970. A threaded cap (not shown) may be removably secured on the threaded neck 962 of the container 960. The seal 701 includes damage indicating elements 610, 615, 630 and 640 as described above, and also includes track and trace elements 710, 720 and 730 as described above. The track and trace damage indicating package 950 shown in FIG. 13 may be used with any desired type of product such as water or other beverages, liquids, flowable powders and particulates, flowable tablets and capsules, and the like.

Figure 14:
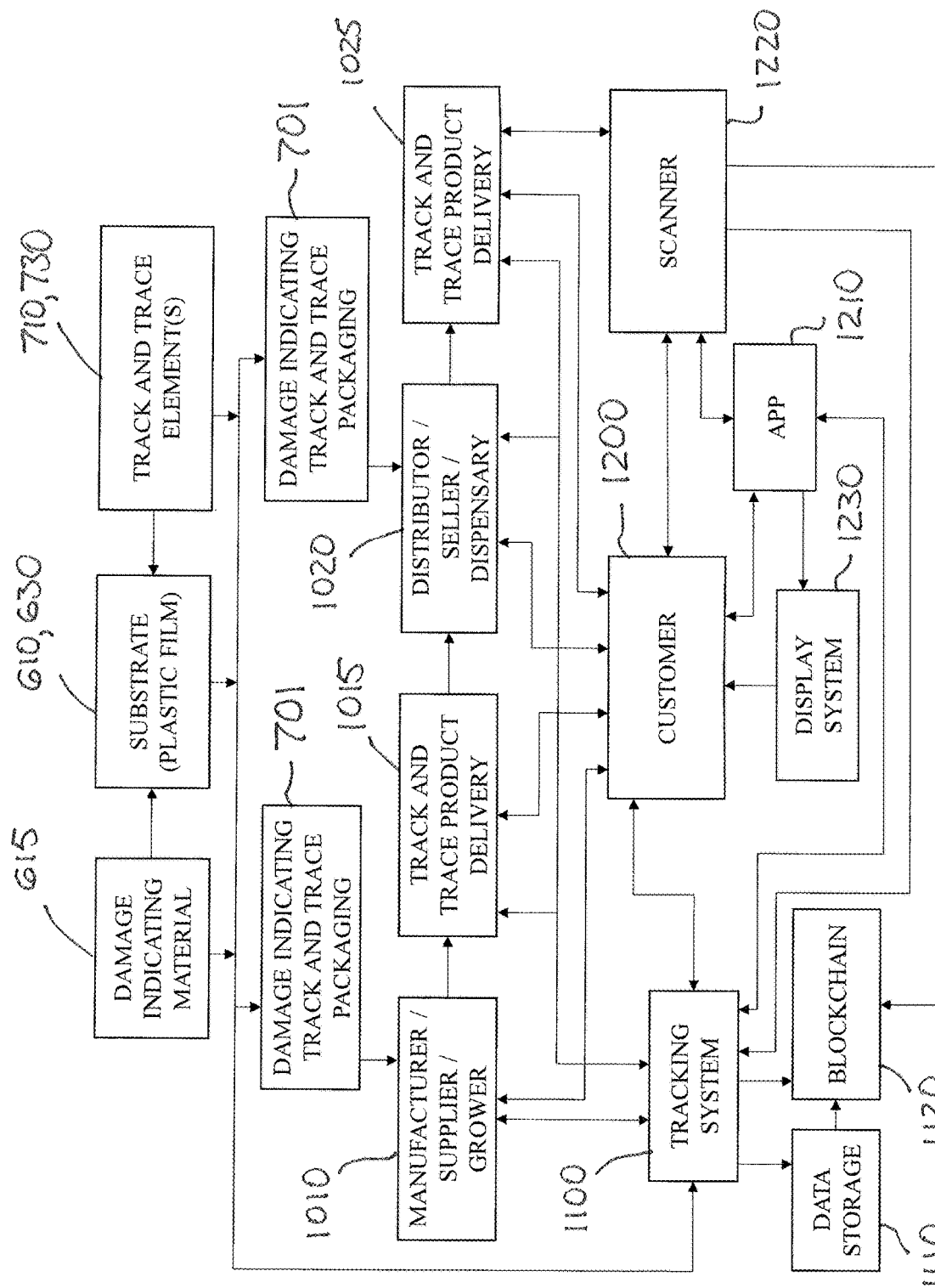
FIG. 14 is a schematic diagram illustrating features of track and trace systems in accordance with embodiments of the present invention.

FIG. 14 illustrates various features of track and trace systems in accordance with embodiments of the present invention. As shown in FIG. 14, in certain embodiments, damage indicating material 615 and track and trace elements 710, 730 may be applied to a packaging substrate 610, 630 such as a plastic film or the like. Track and trace packaging 701 is therefore provided that may be applied to a product at various stages of a supply chain. For example, the damage indicating track and trace packaging 701 may be applied by a manufacturer, supplier and/or grower 1010 at an early stage of the supply chain. Alternatively, the damage indicating track and trace packaging 701 may be applied by a distributor, seller and/or dispensary 1020 further downstream in the supply chain. When the damage indicating track and track packaging 701 is applied at the manufacturing, supplying or growing stage 1010, the product may thereafter be delivered 1015 to a distributor, seller, dispensary 1020 or the like with the track and trace packaging applied thereto. As further shown in FIG. 14, damage indicated packaging applied by a distributor, seller, dispensary or the like may be delivered 1025 to a customer 1200 with the track and trace packaging applied 701. Alternatively, after the damage indicating track and trace packaging 701 has been applied by the manufacturer, supplier, grower 1010 or the like, the track and trace product may be delivered directly to a customer 1200.

Upon delivery of a track and trace product to the customer 1200, the customer may verify track and trace information, for example, by use of a scanner 1220 and app 1210. The app 1210 may communicate with a display system 1230 which can be viewed or otherwise accessed by the customer. For example, the app 1210 may be loaded onto the customer's smart phone or other computing device, which may also include a display 1230. When a scanner 1220 is used, it can be a standalone scanner, or may be integral with the user's smart phone or other personal device. The scanner 1220 may be used to detect track and trace information provided by the track and trace elements 710, 730. Furthermore, the scanner 1220 may be used to detect a color change or the like of the damage indicating material 615, e.g., by the use of a visible light, IR and/or UV detector capable of sending color changes and the like. In addition, the customer 1200 may visually inspect the packaging 701 to determine whether the damage indicating material have been exposed to air.

As further shown in FIG. 14, the track and trace and damage indicating system may include a tracking system 1100 that receives input from various sources including: from the point or location that the track and trace elements 710, 730 and damage indicating material 615 is applied to a packaging substrate 610, 630; at the point a manufacturer, supplier, or grower 1010 applies the damage indicating track and trace packaging 710 to a product; during transportation and/or delivery 1015 of the track and trace product from the manufacturer, supplier or grower 1010; at the distributor, seller or dispensary location 1020; during transport and/or delivery 1025 of the track and trace product from the distributor, seller or dispensary 1020; when the customer 1200 receives a track and trace product; when the customer 1200 or another person scans 1220 the track and trace product; and/or when the customer 1200 or others utilize the app 1210 to retrieve track and trace information.

As further shown in FIG. 14, the tracking system 1110 includes outputs to various locations or stages of the supply chain, including outputs to: the manufacturer, supplier or grower 1010; the track and trace product transportation and/or delivery 1015 from the manufacturer, supplier or grower 1010; the distributor, seller or dispensary 1020; the track and trace product transport and delivery 1025; the customer 1200; a data storage system 1110; and/or a blockchain system 1120. The data system may receive, store and transmit data using various types of hardware and software systems known to those skilled in the art and more fully described below. The blockchain system may include cryptography, point-to-point communication networks and program protocols as known to those skilled in the art. Blockchain allows digital information to be tracked and stored securely on multiple computers or blocks in a network. Data contained in each block can be verified by the previous block, preventing users from altering information. The interconnected nature of the blockchain ensures the accuracy and validity of collected data.

As described above, the packaging substrates for the track and trace elements and for the damage indicating materials may be made from plastic film or the like. Suitable substrate types include plastic, glass, metal, organic composites (binder such as cellulose, polymers, etc.), inorganic composites (binder such a zeolite, silica gel, etc.), nanocomposites and the like. Other embodiments of formulations include multi-layer plastic films, filled reinforced plastic composites, and filled non-reinforcing plastic composites.

The track and trace elements and/or damage indicating materials may be printed or applied to a packaging substrate by any suitable means such as spraying, screen printing, brushing, immersion, ink jet printing, adhesives or the like. Various printing variations may be used for the track and trace elements and/or damage indicating inks, such as variable coating thicknesses, and variable coating line widths. A micro dot or dot matrix style to increase surface area of ink within overall mark is illustrated in FIG. 15. A cross hatch style to increase surface area of ink within overall mark is illustrated in FIG. 16.

In one embodiment, the packaging in its completed form may have a company logo displayed clearly on one side and a clear icon of damage indication such as a trashcan on the reverse side. If opened for intended use or accidentally or intentionally pricked exposing the product inside, exposed to extreme heat, or excessive compression or tension, the coloring of the packaging will change, highlighting the company logo with universal "NO" symbols emblazoned over it, including, but not limited to the symbols for "Do not Enter", "Prohibited", an "X", a circle, square, triangle with a backslash or line going through it, horizontally, vertically, or diagonally, a stop sign, a hand, trash can or customized symbol. On the reverse side a trash can icon or alternative customized symbol(s) will also color change indicating that the packaging and the product contained within may be damages and should be thrown away.

The disclosed embodiments are illustrative, not restrictive. While specific configurations including a packaged condom and other types of containers have been described, it is understood that the present invention can be applied to a wide variety of other packaging for other types of products including paper, foils, or plastics, as well as any combination thereof, such as foil-lined paper, plastic-lined paper or a wax-lined paper. The package may take a variety of forms such as rectangular, oval, etc., or can be male or female condom packaging, or packaging for other types of products. The package may be provided with a separation structure, such as an edge tear area, a zipper-locked edge area, or an operable, adhesively sealed edge area. There are many alternative ways of implementing the invention. Alternative embodiments include transparent or translucent plastic lids, transparent or translucent plastic containers. Plastics can be LDPE, HDPE, PP, or a combination of plastics including, but not limited to polycarbonates, or acrylics.

Package style embodiments include wrapper, seals, vacuum-sealed overwrap, vacuum-sealed overwrap with interior printed surface, vacuum-sealed overwrap with printed coupon between item and interior overwrap surface, vacuum-sealed overwrap containing multi-layer plastic with oxygen-indicating ink added as an internal layer, and vacuum-sealed overwrap containing multi-layer plastic with oxygen-indicating ink compounded into plastic material comprising at least one layer of the multi-layer film.

The following examples are intended to illustrate various aspects of the present invention, and are not intended to limit the scope of the invention.

Example 1

A damage indicating material was made as follows. Ten grams of 5% aqueous solution of hydroxyethylcellulose (HEC) and 2.5 grams of 5% aqueous dispersion of titanium dioxide ($TiO_2$) were added to a 20 mL amber glass scintillation vial. The mixture was sonicated for approximately 30 minutes in a warm ultrasonic bath. After dispersing the $TiO_2$, 0.5 grams of 5% aqueous solution of methylene blue (MB) was added to the mixture. The mixture was sonicated or magnetically stirred for 10-15 minutes to disperse the MB in the aqueous mixture. After dispersing the MB into the mixture, 0.15 g of triethanolamine (TEOA) were added using a plastic or glass pipet. The final formulation was sonicated for approximately 30 minutes in a warm ultrasonic bath prior to substrate application.

The formulation was applied as a thin layer of glass or plastic film substrate and was allowed to dry. Standard laboratory glass microscope slides and 3 mil thick co-extruded polyethylene-nylon vacuum packaging film were used as substrates for coating. The plastic film was also used as an overwrap to seal the coated glass slides or plastic film prior to activation and deactivation. The formulation was typically applied by painting a thin film on the substrate with a paint brush. Uniform film casting can also be accomplished using a spin coater or K bar techniques. The coated substrates were allowed to dry within a dark oven set at 50° C. for 16 hours. The resultant blue layer had a dry-film thickness of approximately 2 mils or less with variations in thickness dependent on the exact formulation. The dried, blue films of damage indicating material were vacuum sealed within a plastic film overwrap. Following evacuation and thermal sealing, the material was "activated" under a UV lamp to convert the blue MB form to a white leuco MB form. Upon such UV exposure, the layer changed from substantially blue to off-white or light gray. After activation, the layer was exposed to air by puncturing or cutting open the vacuum overwrap, resulting in a change back to the blue color. After the color transformation, the layer retained a significant degree of its blue color for over several weeks.

The formulations in Examples 2 through 8 used commercial ink formulations for flexo and gravure printing by Siegwerks (Ink 4 and Ink 6). Ink 6 was also modified for this work to give Ink 6A with no water, ink 6B with no water or titanium dioxide, ink 6C with no water and nano titanium oxide and ink 6D with no water and additives to increase oxygen permeability. Thus, the six different starting ink formulations are Ink 4, 6, 6A, 6B, 6C and 6D. Modifications to the starting ink formulations yield reactive/responsive, damage indicating materials. The Reactive/responsive, damage indicating materials are labeled as Ink X-Y where X=4, 6A, 6B, 6C, 6D and Y=A through J.

A reactive/responsive ink formulation was made as follows. Two grams of well mixed ink formulation (Ink 4, 6A, 6B, 6C or 6D) were added to a 20 mL amber glass scintillation vial. Then 0.01-0.02 grams of the reactive/responsive species (methylene blue=MB) was weighed into the vial. Finally 0.10-0.80 grams of a sacrificial electron donor (TEOA) was weighed into the vial. A magnetic stir bar was added to the vial and the mixture was stirred and/or ultrasonicated until the dye was well dissolved or dispersed (half hour to 24 hours).

Prior to printing, the substrate was dried to remove any residual moisture. The substrate was a 75 micron thick, 2 layer co-extruded film composed of nylon and polyethylene. A small amount of the reactive/responsive ink formulation was applied to the dried substrate. A K-Bar (#0, #2 or #6) was used to achieve a uniform film thickness. The ink was drawn down with the K-Bar using steady, constant pressure and speed. The printed substrate was dried in a 50 degree Celsius oven until the ink set (1 hour to 24 hours). The dried printed substrate was evacuated and heat sealed using a commercial vacuum sealer. In one package style of this embodiment, the dried printed substrate is used as a vacuum sealed overwrap around an already-packaged product such as a packaged condom.

The reactive/responsive ink formulation on the dried, printed and vacuum-sealed substrate was activated with UV light. The UV lamp was allowed to warm up for at least 1 hour so that the UV intensity was stable and consistent. The ink was UV activated by exposing the printed and sealed substrate at a set distance (3 inches) and intensity (~10 mW/cm2 with 1 hour warm up) to achieve a stable color change. The MB changes from blue to the colorless leuco form. After activation, the layer was exposed to air by puncturing or cutting open the vacuum-sealed overwrap. Color change was monitored over the course of approximately 20 minutes. The color started to change with the first minute after exposure.

Example 2

Reactive/responsive, damage indicating materials were made using Ink 6 with methylene blue (MB) as the reactive/responsive species and triethanolamine (TEOA) as the sacrificial electron donor as set forth in Table 1. Quantities are in grams. The damage indicating material was made as follows. Two grams of well mixed Ink 6 were added to a 20 mL amber glass scintillation vial. Then 0.01-0.02 grams of the reactive/responsive species (methylene blue=MB) was weighed into the vial. Finally 0.10-0.80 grams of a sacrificial electron donor (TEOA) was weighed into the vial. A magnetic stir bar was added to the vial and the mixture was stirred and/or ultrasonicated until the dye was well dissolved or dispersed (half hour to 24 hours).

Prior to printing, the substrate was dried to remove any residual moisture. The substrate was a 75 micron thick, 2 layer co-extruded film composed of nylon and polyethylene. A small amount of the reactive/responsive ink formulation was applied to the dried substrate. A K-Bar (#0, #2 or #6) was used to achieve a uniform film thickness. The ink was drawn down with the K-Bar using steady, constant pressure and speed. The printed substrate was dried in a 50 degree Celsius oven until the ink set (1 hour to 24 hours). The dried printed substrate was evacuated and heat sealed using a commercial vacuum sealer. In one package style of this embodiment, the dried printed substrate is used as a vacuum sealed overwrap around an already-packaged product such as a packaged condom.

The damage indicating material was activated on the dried, printed and vacuum-sealed substrate with UV light. The UV lamp was allowed to warm up for at least 1 hour so that the UV intensity was stable and consistent. The ink was UV activated by exposing the printed and sealed substrate at a set distance (3 inches) and intensity (~10 mW/cm2 with 1 hour warm up) to achieve a stable color change. The MB changes from blue to the colorless leuco form. After activation, the layer was exposed to air by puncturing or cutting open the vacuum-sealed overwrap. Color change was monitored over the course of approximately 20 minutes. The color started to change with the first minute after exposure.

TABLE 1

| Formulation | Ink 6 | MB | moles MB | TEOA | moles TEOA | moles SED/ moles MB | moles SED/ moles MB per g ink |
|---|---|---|---|---|---|---|---|
| A | 2 | 0.1 | 0.0002675 | 0 | 0 | 0 | 0 |
| B | 2 | 0.1 | 0.0002675 | 0.1 | 0.00067 | 2.5 | 1.3 |
| C | 2 | 0.02 | 0.0000535 | 0.2 | 0.001341 | 25.1 | 12.5 |
| D | 2 | 0.02 | 0.0000535 | 0.4 | 0.002681 | 50.1 | 25.1 |
| H | 2 | 0.01 | 0.0000267 | 0.2 | 0.001341 | 50.1 | 25.1 |
| I | 2 | 0.01 | 0.0000267 | 0.4 | 0.002681 | 100.2 | 50.1 |
| J | 2 | 0.01 | 0.0000267 | 0.8 | 0.005362 | 200.5 | 100.2 |

Example 3

Reactive/responsive, damage indicating materials were made using Ink 6 with methylene blue (MB) as the reactive/responsive species and glycerol as the sacrificial electron donor as set forth in Table 2. Quantities are in grams. The damage indicating material was made as described in Example 2.

TABLE 2

| Formulation | Ink 6 | MB | moles MB | glycerol | moles glycerol | moles SED/ moles MB | moles SED/ moles MB per g ink |
|---|---|---|---|---|---|---|---|
| E | 1 | 0.1 | 0.0002675 | 0.062 | 0.000673 | 2.5 | 2.5 |
| F | 1 | 0.01 | 0.0000267 | 0.062 | 0.000673 | 25.2 | 25.2 |
| G | 1 | 0.01 | 0.0000267 | 0.124 | 0.001347 | 50.3 | 50.3 |

Example 4

Reactive/responsive, damage indicating materials were made using Ink 6 with resorufin (RR) as the reactive/responsive species and triethanolamine (TEOA) as the sacrificial electron donor as set forth in Table 3. Quantities are in grams. The damage indicating material was made as described in Example 2.

TABLE 3

| Formulation | Ink 6 | RR | moles RR | TEOA | moles TEOA | moles SED/ moles RR | moles SED/ moles RR per g ink |
|---|---|---|---|---|---|---|---|
| H | 2 | 0.006 | 0.0000267 | 0.2 | 0.001341 | 50.1 | 25.1 |
| H2 | 2 | 0.011 | 0.0000535 | 0.2 | 0.001341 | 25.1 | 12.5 |
| I | 2 | 0.006 | 0.0000267 | 0.4 | 0.002681 | 100.2 | 50.1 |

Example 5

Reactive/responsive, damage indicating materials were made using Ink 4 with resorufin (RR) as the reactive/responsive species and triethanolamine (TEOA) as the sacrificial electron donor as set forth in Table 4. Quantities are in grams. The damage indicating material was made as described in Example 2.

TABLE 4

| Formulation | Ink 4 | RR | moles RR | TEOA | moles TEOA | moles SED/ moles RR | moles SED/ moles RR per g ink |
|---|---|---|---|---|---|---|---|
| H | 2 | 0.006 | 0.0000267 | 0.2 | 0.001341 | 50.1 | 25.1 |
| H2 | 2 | 0.011 | 0.0000535 | 0.2 | 0.001341 | 25.1 | 12.5 |
| I | 2 | 0.006 | 0.0000267 | 0.4 | 0.002681 | 100.2 | 50.1 |

Example 6

Reactive/responsive, damage indicating materials were made using Ink 6A, 6C and 6D with methylene blue (MB) as the reactive/responsive species and triethanolamine (TEDA) as the sacrificial electron donor as set forth in Table 5. Quantities are in grams. The damage indicating material was made as described in Example 2.

TABLE 5

| Formulation | Ink 6A | MB | moles MB | TEOA | moles TEOA | moles SED/ moles MB | moles SED/ moles MB per g ink |
|---|---|---|---|---|---|---|---|
| H | 2 | 0.01 | 0.0000267 | 0.2 | 0.001341 | 50.1 | 25.1 |
| I | 2 | 0.01 | 0.0000267 | 0.4 | 0.002681 | 100.2 | 50.1 |

| Formulation | Ink 6C | MB | moles MB | TEOA | moles TEOA | moles SED/ moles MB | moles SED/ moles MB per g ink |
|---|---|---|---|---|---|---|---|
| H | 2 | 0.01 | 0.0000267 | 0.2 | 0.001341 | 50.1 | 25.1 |
| I | 2 | 0.01 | 0.0000267 | 0.4 | 0.002681 | 100.2 | 50.1 |

| Formulation | Ink 6D | MB | moles MB | TEOA | moles TEOA | moles SED/ moles MB | moles SED/ moles MB per g ink |
|---|---|---|---|---|---|---|---|
| H | 2 | 0.01 | 0.0000267 | 0.2 | 0.001341 | 50.1 | 25.1 |
| I | 2 | 0.01 | 0.0000267 | 0.4 | 0.002681 | 100.2 | 50.1 |

Example 7

Reactive/responsive, damage indicating materials were made using Ink 6A and 6D with resorufin (RR) as the reactive/responsive species and triethanolamine (TEOA) as the sacrificial electron donor as set forth in Table 6. Quantities are in grams. The damage indicating material was made as described in Example 2.

TABLE 6

| Formulation | Ink 6A | RR | moles RR | TEOA | moles TEOA | moles SED/ moles RR | moles SED/ moles RR per g ink |
|---|---|---|---|---|---|---|---|
| H | 2 | 0.006 | 0.0000267 | 0.2 | 0.001341 | 50.1 | 25.1 |

| Formulation | Ink 6D | RR | moles RR | TEOA | moles TEOA | moles SED/ moles RR | moles SED/ moles RR per g ink |
|---|---|---|---|---|---|---|---|
| H | 2 | 0.006 | 0.0000267 | 0.2 | 0.001341 | 50.1 | 25.1 |

Example 8

Reactive/responsive, damage indicating materials were made using Ink 6C with resorufin (RR) as the reactive/responsive species and triethanolamine (TEOA) as the sacrificial electron donor as set forth in Table 7. Response was modulated with dilute acetic acid and dilute ammonium hydroxide. Quantities are in grams. The damage indicating material was made as described in Example 2.

TABLE 7

| Formulation | Ink 6C | RR | moles RR | TEOA | moles TEOA | moles SED/ moles RR | moles SED/ moles RR per g ink |
|---|---|---|---|---|---|---|---|
| H | 2 | 0.006 | 0.0000267 | 0.2 | 0.001341 | 50.1 | 25.1 |

FIGS. 17-20 illustrate results from the examples above.

FIG. 17: UV activation of Ink 6C with MB and H/I modifications.

FIG. 18: Air exposure of UV activated Ink 6C with MB and H/I modifications.

FIG. 19: UV activation and air exposure (after 2 mins) of Ink 4 with RR and H/I modifications.

FIG. 20: UV activation and air exposure (after 15 mins) of Ink 4 with RR and H/I modifications.

Example 9

Reactive/responsive, damage indicating materials were made using Ink 4 and Ink 6 with methylene blue (MB) as the reactive/responsive species and triethanolamine (TEOA) as the sacrificial electron donor as set forth in Table X. Quantities are in grams. The damage indicating material was made as follows. Two grams of well mixed ink 4 or Ink 6 were added to a 20 mL amber glass scintillation vial. Then 0.1 grams of the reactive/responsive species (methylene blue=MB) was weighed into the vial. Finally 0.10 grams of a sacrificial electron donor (TEOA) was weighed into the vial. A magnetic stir bar was added to the vial and the mixture was stirred and/or ultrasonicated until the dye was well dissolved or dispersed (half hour to 24 hours).

Prior to printing, the substrate was dried to remove any residual moisture. The substrate was a 75 micron thick, 2 layer co-extruded film composed of nylon and polyethylene. A small amount of the reactive/responsive ink formulation was applied to the dried substrate. A K-Bar (46) was used to achieve a uniform film thickness. The ink was drawn down with the K-Bar using steady, constant pressure and speed. The printed substrate was dried in a 50 degree Celsius oven until the ink set (1 hour to 24 hours). The dried printed substrate was evacuated and heat sealed using a commercial vacuum sealer. In one package style of this embodiment, the dried printed substrate is used as a vacuum sealed overwrap around an already-packaged product such as a packaged condom.

The damage indicating material was activated on the dried, printed and vacuum-sealed substrate with UV light. The UV lamp was allowed to warm up for at least 1 hour so that the UV intensity was stable and consistent. The ink was UV activated by exposing the printed and sealed substrate at a set distance (3 inches) and intensity (~10 mW/cm2 with 1 hour warm up) to achieve a stable color change. The MB changes from blue to lighter blue or colorless leuco form. After activation, the layer was exposed to air by puncturing or cutting open the vacuum-sealed overwrap. Color change was monitored over the course of one week, as shown in FIG. 21.

TABLE 8

| Formulation | Ink 4 or Ink 6 | MB | moles MB | TEOA | moles TEOA | moles SED/ moles MB | moles SED/ MB per g ink |
|---|---|---|---|---|---|---|---|
| A | 2 | 0.1 | 0.0002675 | 0 | 0 | 0 | 0 |
| B | 2 | 0.1 | 0.0002675 | 0.1 | 0.00067 | 2.5 | 1.3 |

For any element expressed herein as a means for performing a specified function, such element is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Programming languages for computer software and other computer-implemented instructions may be translated into machine language by a compiler or an assembler before execution and/or may be translated directly at run time by an interpreter. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

As employed herein, an application server may be a server that hosts an API to expose business logic and business processes for use by other applications. The application servers may mainly serve web-based applications, while other servers can perform as session initiation protocol servers, for instance, or work with telephony networks.

Although some embodiments may be illustrated and described as comprising functional components, software, engines, and/or modules performing various operations, it can be appreciated that such components or modules may be implemented by one or more hardware components, software components, and/or combination thereof.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A track and trace package comprising:
a product pocket comprising an interior volume structured and arranged to contain a product; and
a first packaging layer between the interior volume of the product pocket and an exterior of the package, wherein the first packaging layer comprises:
an inner wrapper layer adjacent the interior volume;
an outer layer comprising a film at least partially covering the inner wrapper layer and the interior volume;
a gap between an exterior surface of the inner wrapper layer and an interior surface of the outer layer;
at least one track and trace element at least partially covering the product pocket attached to at least one of the inner wrapper layer or outer layer, or located inside the gap;
a damage indicating material in the gap between the exterior surface of the inner wrapper layer and the interior surface of the outer layer, wherein the gap is evacuated or at least partially filled with an inert gas; and
a taggant material located inside the gap with the damage indicating material.

2. The track and trace package of claim 1, wherein the damage indicating material or taggant material is applied to the interior surface of the outer layer.

3. The track and trace package of claim 1, wherein the damage indicating material or taggant material is applied to the exterior surface of the inner wrapper layer.

4. The track and trace package of claim 1, wherein the at least one track and trace element comprises a scannable code, an RFID device, a BLE device, a WiFi device, a GPS device or a combination thereof.

5. The track and trace package of claim 1, wherein the at least one track and trace element comprises a QR code and/or a GPS transceiver.

6. The track and trace package of claim 1, wherein the at least one track and trace element is attached to the interior surface of the outer layer or to the exterior surface of the inner wrapper layer.

7. The track and trace package of claim 1, wherein the outer layer is coextensive with the inner wrapper layer.

8. The track and trace package of claim 1, wherein a damage indicating material changes color when exposed to oxygen.

9. The track and trace package of claim 1, wherein the product to be contained in the package is a condom, food product, beverage, pharmaceutical product or cannabis product.

10. The track and trace package of claim 1, wherein the taggant material is combined with the damage indicating material.

11. The track and trace package of claim 1, wherein the damage indicating material comprises a coating and the taggant material comprises particles contained on or in the coating.

12. A track and trace packaging material comprising:
an inner wrapper layer comprising a film;
an outer wrapper layer comprising a film;
a gap between the inner and outer wrapper layers;
at least one track and trace element attached to the inner or outer wrapper layer, or located in the gap between the inner and outer wrapper layers;
damage indicating material in the gap between the inner and outer wrapper layers, wherein the gap is evacuated or at least partially filled with an inert gas; and
a taggant material located inside the gap with the damage indicating material.

13. The track and trace packaging material of claim 12, wherein the track and trace element comprises a scannable code, an RFID device, a BLE device, a WiFi device, a GPS device or a combination thereof.

14. The track and trace packaging material of claim 12, wherein the taggant material is combined with the damage indicating material.

15. The track and trace packaging material of claim 14, wherein the damage indicating material comprises a coating and the taggant material comprises particles contained on or in the coating.

16. A method of making a track and trace packaging material comprising:
providing an inner wrapper layer comprising a film, an outer wrapper layer comprising a film, and a gap between the inner and outer wrapper layers;
applying at least one track and trace element to the inner or outer wrapper layer, or in the pocket between the inner and outer wrapper layers; and
applying a damage indicating material to the inner or outer wrapper layer inside the gap, wherein the gap is evacuated or at least partially filled with an inert gas.

17. The method of claim 16, wherein the taggant material is combined with the damage indicating material.

18. The method of claim 17, wherein the damage indicating material comprises a coating and the taggant material comprises particles contained on or in the coating.

* * * * *